(12) United States Patent
Kaminushi

(10) Patent No.: US 9,913,078 B2
(45) Date of Patent: Mar. 6, 2018

(54) INFORMATION PROCESSING SYSTEM, INFORMATION PROCESSING APPARATUS, DATA ACQUISITION METHOD, AND PROGRAM

(71) Applicant: Kyohsuke Kaminushi, Kanagawa (JP)

(72) Inventor: Kyohsuke Kaminushi, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 34 days.

(21) Appl. No.: 14/851,089

(22) Filed: Sep. 11, 2015

(65) Prior Publication Data

US 2016/0081129 A1 Mar. 17, 2016

(30) Foreign Application Priority Data

Sep. 16, 2014 (JP) .................................. 2014-187361
Aug. 27, 2015 (JP) .................................. 2015-167412

(51) Int. Cl.
*H04B 7/00* (2006.01)
*H04W 4/00* (2018.01)
*H04L 25/20* (2006.01)

(52) U.S. Cl.
CPC ............. *H04W 4/008* (2013.01); *H04L 25/20* (2013.01)

(58) Field of Classification Search
CPC .............................. H04W 4/008; H04W 84/12
USPC .................................................. 455/41.1, 41.2
See application file for complete search history.

(56) References Cited

U.S. PATENT DOCUMENTS

| 7,865,932 | B2 | 1/2011 | Kubota | |
| 2006/0264239 | A1* | 11/2006 | Tominaga | G06F 17/30194 455/558 |
| 2014/0111629 | A1* | 4/2014 | Morris | H04N 9/31 348/77 |

FOREIGN PATENT DOCUMENTS

| JP | 2005-208823 | 8/2005 |
| JP | 2014-048567 | 3/2014 |

* cited by examiner

*Primary Examiner* — Tu X Nguyen
(74) *Attorney, Agent, or Firm* — IPUSA, PLLC

(57) ABSTRACT

An information processing system includes a first apparatus information acquiring unit acquiring apparatus information of an electronic apparatus, an output request unit sending an output request to the information processing apparatus by using the apparatus information, a memory unit storing a storing destination of the electronic data output by the electronic apparatus and identification information of the electronic apparatus while associating these upon receipt of the output request, an acquisition request processing unit sending to a second terminal apparatus the electronic data based on the storing destination stored in the memory unit in association with the identification information in a case where an acquisition request is received, a second apparatus information acquiring unit acquiring the apparatus information, and an acquisition request unit sending the acquisition request for the electronic data to the information processing apparatus and acquires the electronic data based on the apparatus information.

11 Claims, 24 Drawing Sheets

FIG.9

| INFORMATION | SETUP EXAMPLE | | |
|---|---|---|---|
| IP ADDRESS | 192.168.0.10 | | |
| HOST NAME | PROJECTOR 1 | | |
| MAC ADDRESS | 00-00-00-00-00-AA | | |
| APPARATUS TYPE | PJ1 | | |
| MEETING ROOM | room1 | | |
| APPARATUS ID | 1395be2d-78db-e1ad-1c75-0820b6029d96 | | |
| ORIGINAL TRACKING INFORMATION | | IP ADDRESS | |
| | | HOST NAME | |
| | | MAC ADDRESS | |
| | | APPARATUS TYPE | |
| | | MEETING ROOM | |
| | | FILE PATH | |

FIG.11

| INFORMATION | SETUP EXAMPLE | | |
|---|---|---|---|
| IP ADDRESS | 192.168.0.10 | | |
| HOST NAME | PROJECTOR 1 | | |
| MAC ADDRESS | 00-00-00-00-00-AA | | |
| APPARATUS TYPE | PJ1 | | |
| MEETING ROOM | room1 | | |
| APPARATUS ID | 1395be2d-78db-e1ad-1c75-0820b6029d96 | | |
| ORIGINAL TRACKING INFORMATION | IP ADDRESS | 192.168.0.11 | |
| | HOST NAME | FILE SERVER 1 | |
| | MAC ADDRESS | 00-00-00-00-00-BB | |
| | APPARATUS TYPE | Fs1 | |
| | MEETING ROOM | room1 | |
| | FILE PATH | C:¥¥AllUsers¥hoge¥PRESENTATION MATERIAL.ppt | |

FIG.12

| REQUEST DESTINATION | OUTPUT START TIME | OUTPUT END TIME | OUTPUT FILE | REQUEST SOURCE |
|---|---|---|---|---|
| PROJECTOR 1 | 13:35 | 13:45 | FILE A | SMARTPHONE a |
| PROJECTOR 2 | 13:45 | 13:55 | FILE B | SMARTPHONE b |
| PROJECTOR 1 | 13:55 | PROJECTING | FILE C | SMARTPHONE c |
| ... | ... | ... | ... | ... |

FIG.16

| INFORMATION | SETUP EXAMPLE | |
|---|---|---|
| IP ADDRESS | 192.168.0.10 | |
| HOST NAME | PROJECTOR 1 | |
| MAC ADDRESS | 00-00-00-00-00-AA | |
| APPARATUS TYPE | PJ1 | |
| MEETING ROOM | room1 | |
| APPARATUS ID | 1395be2d-78db-e1ad-1c75-0820b6029d96 | |
| ORIGINAL TRACKING INFORMATION | IP ADDRESS | |
| | HOST NAME | |
| | MAC ADDRESS | |
| | APPARATUS TYPE | |
| | MEETING ROOM | |
| | FILE PATH | |
| GUEST ID | | |

FIG.18

| INFORMATION | SETUP EXAMPLE | |
|---|---|---|
| IP ADDRESS | 192.168.0.10 | |
| HOST NAME | PROJECTOR 1 | |
| MAC ADDRESS | 00-00-00-00-00-AA | |
| APPARATUS TYPE | PJ1 | |
| MEETING ROOM | room1 | |
| APPARATUS ID | 1395be2d-78db-e1ad-1c75-0820b6029d96 | |
| ORIGINAL TRACKING INFORMATION | IP ADDRESS | 192.168.0.11 |
| | HOST NAME | FILE SERVER 1 |
| | MAC ADDRESS | 00-00-00-00-00-BB |
| | APPARATUS TYPE | Fs1 |
| | MEETING ROOM | room1 |
| | FILE PATH | C:¥¥AllUsers¥hoge¥PRESENTATION MATERIAL.ppt |
| GUEST ID | fa719b17-2a7a-aa79-3a99-e84ad2982635 | |

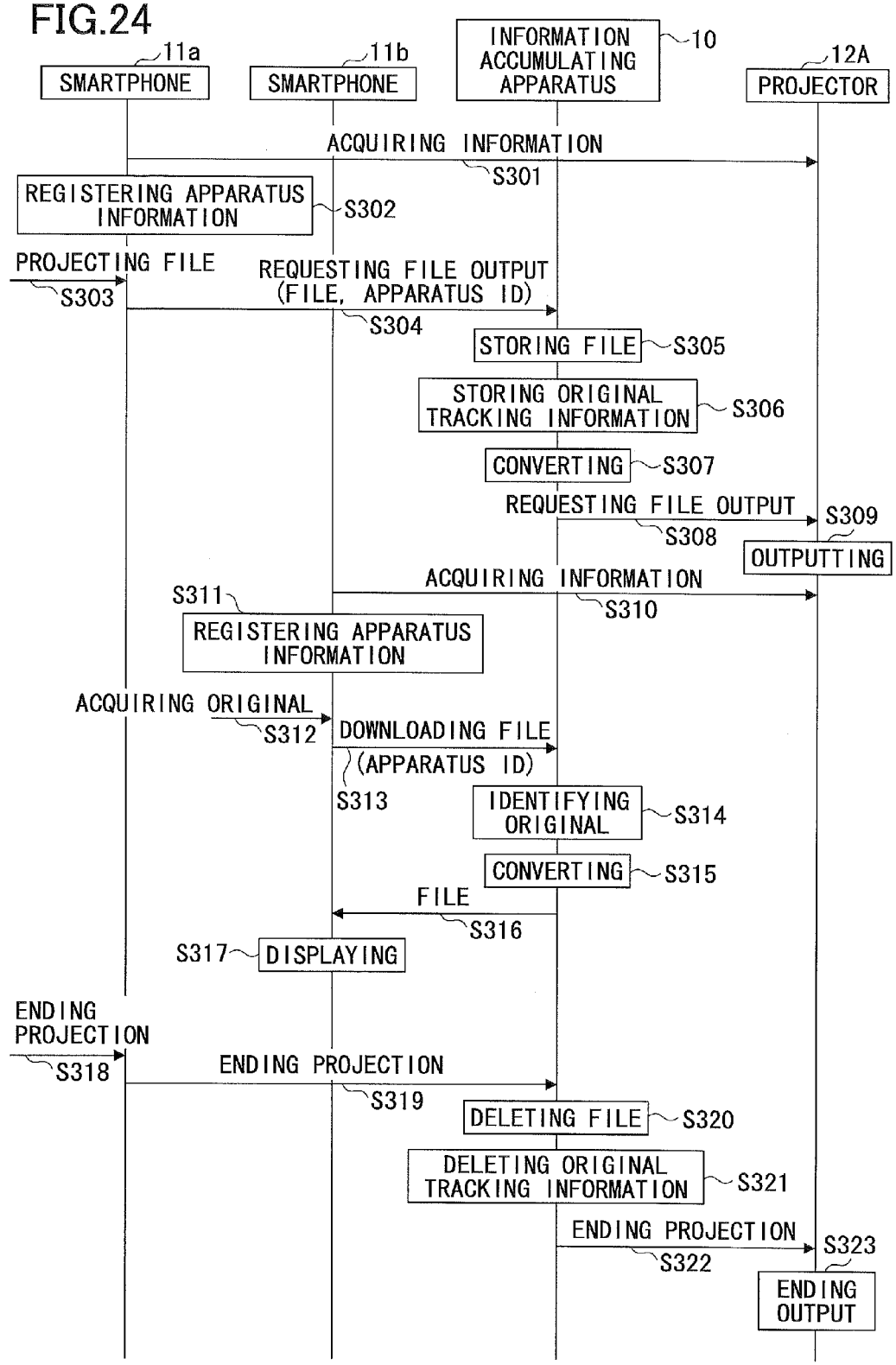

INFORMATION PROCESSING SYSTEM, INFORMATION PROCESSING APPARATUS, DATA ACQUISITION METHOD, AND PROGRAM

BACKGROUND OF THE INVENTION

1. Field of the Invention

The present invention relates to an information processing system, an information processing apparatus, a data acquisition method, and a program.

2. Description of the Related Art

An example of a projector network system is formed by connecting multiple terminal apparatuses and a projector so as to share an image data file held by the terminal apparatus (for example, Patent Document 1).

Patent Document 1: Japanese Laid-Open Patent Publication No. 2005-208823

SUMMARY OF THE INVENTION

For example, a user controls an electronic apparatus such as a printer, a multifunction peripheral, or a projector connected to a network such as a LAN using various terminal apparatuses such as a mobile phone, a smartphone, or a tablet terminal to cause the electronic apparatus to output a file.

A third party other than the user who controls to cause the electronic apparatus to output the file using the terminal apparatus may wish to acquire the file output to the electronic apparatus and store into a terminal apparatus of the third party. However, the third party cannot easily acquire the file output to the electronic apparatus.

It is an object of at least one embodiment of the present invention to provide an information processing system, an information processing apparatus, a data acquisition method, and a program, with which data output by an electronic apparatus can be easily acquired by an terminal apparatus.

One aspect of the embodiments of the present invention may be to provide an information processing system including a plurality of terminal apparatuses; and at least one information processing apparatus connected to the plurality of terminal apparatuses, wherein a first terminal apparatus, which is one of the plurality of terminal apparatuses, includes a first apparatus information acquiring unit which acquires apparatus information of one electronic apparatus, which is one of a plurality of electronic apparatuses, from an apparatus information memory device storing the apparatus information of the one electronic apparatus, and an output request unit which sends an output request that the one electronic apparatus outputs electronic data to the at least one information processing apparatus by using the apparatus information of the one electronic apparatus, wherein the at least one information processing apparatus includes a request reception unit which receives the output request that the one electronic apparatus outputs the electronic data, a memory unit which stores a storing destination of the electronic data to be output by the one electronic apparatus and identification information of the one electronic apparatus while associating the storing destination and the identification information in response to the output request received by the request reception unit, an output request processing unit which requests the one electronic apparatus to output the electronic data upon receipt of the output request that the one electronic apparatus outputs the electronic data, and an acquisition request processing unit which sends to a second terminal apparatus, which is another one of the plurality of terminal apparatuses, the electronic data output by the one electronic apparatus based on the storing destination of the electronic data stored in the memory unit in association with the identification information of the one electronic apparatus in a case where an acquisition request to acquire the electronic data output by the one electronic apparatus is received from the second terminal apparatus, wherein the second terminal apparatus includes a second apparatus information acquiring unit which acquires the apparatus information of the one electronic apparatus from the apparatus information memory device, and an acquisition request unit which sends the acquisition request for the electronic data output by the one electronic apparatus to the at least one information processing apparatus and acquires the electronic data output by the one electronic apparatus from the at least one information processing apparatus based on the apparatus information of the one electronic apparatus.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

BRIEF DESCRIPTION OF THE DRAWINGS

FIG. 9 illustrates an exemplary structure of apparatus information stored by a short-range wireless apparatus.

FIG. 11 illustrates an exemplary structure of apparatus information in which original tracking information is registered.

FIG. 12 illustrates a structure of exemplary request information.

FIG. 16 illustrates another exemplary structure of the apparatus information stored by the short-range wireless apparatus.

FIG. 18 illustrates another exemplary structure of the apparatus information in which the original tracking information is registered.

FIG. 24 is a sequence chart of another exemplary process of projecting the file and acquiring the original in the collaboration processing system of the embodiment.

DETAILED DESCRIPTION OF THE PREFERRED EMBODIMENTS

A description is given below, with reference to the FIG. 1 through FIG. 24 of embodiments of the present invention. Where the same reference symbols are attached to the same parts, repeated description of the parts is omitted.

Reference symbols typically designate as follows:
1: collaboration processing system;
10: information accumulating apparatus;
11, 11a, 11b: smartphone;
12, 12A, 12B: projector;
13A, 13B: interactive whiteboard (IWB);
14A, 14B: multifunction peripheral (MFP);
16A, 16B, 17A, 17B, 18A, 18B: short-range wireless apparatus;
19: relay server;
21: display unit;
22: input unit;
23: wireless communication unit;
24: short-range wireless communication unit;
25: data sending unit;
26: data receiving unit;
27: apparatus information acquiring unit;
28: memory unit;
29: output request unit;
30: original acquisition requesting unit
41: input unit;
42: communication unit;
43: data sending unit;
44: data receiving unit;
45: file administration unit;
46: request inquiry unit;
47: request reception unit;
48: request processing unit;
49: memory unit;
50: request sending unit;
61: wireless communication unit;
62: short-range wireless communication unit;
63: data sending unit;
64: data receiving unit;
65: image output unit;
66: request reception unit;
67: request processing unit;
68: short-range wireless communication information administration unit;
69: memory unit;
70: guest ID generating unit;
500: computer;
501: input apparatus;
502: display apparatus;
503: external I/F;
503a: recording medium;
504: RAM;
505: ROM;
506: CPU;
507: communication I/F;
508: HDD;
600: terminal apparatus;
601: CPU;
602: ROM;
603: RAM;
604: EEPROM;
605: CMOS sensor;
606: acceleration and direction sensor;
607: record media;
608: media drive;
609: audio input unit;
610: audio output unit;
611: antenna;
612: communication unit;
613: wireless LAN communication unit;
614: short-range wireless communication antenna;
615: short-range wireless communication unit;
616: display;
617: touch panel;
618: battery;
619: bus line;
701: CPU;
702: RAM;
703: ROM;
704: communication unit;
705: antenna;
706: operation keys;
707: short-range wireless communication unit;
708: short-range wireless communication antenna;
709: projection device;
710: bus line;
B: bus; and
N1-N3: network.

A collaboration processing system 1 of the embodiment is an example of an information processing system.

First Embodiment

<System Structure>

Figure 1:
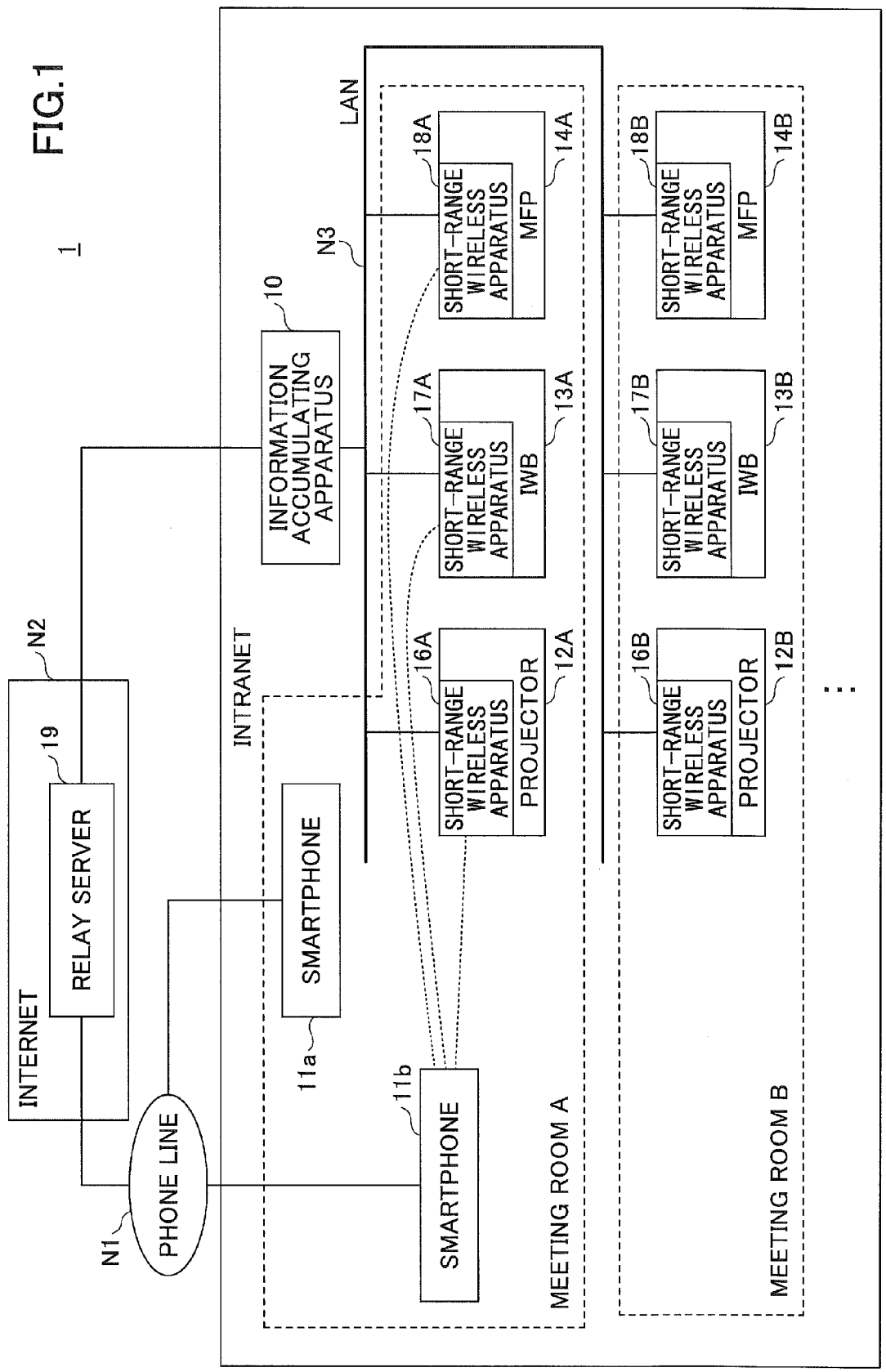
FIG. 1 illustrates an exemplary structure of a collaboration processing system of an embodiment.

FIG. 1 illustrates an exemplary structure of a collaboration processing system of the first embodiment. An exemplary structure of the collaboration processing system 1 includes an information accumulating apparatus 10, smartphones 11a and 11b, projectors 12A and 12B, interactive whiteboards (IWB) 13A and 13B, multifunction peripherals (MFP) 14A and 14B, and a relay server 19.

The short-range wireless apparatuses 16A, 17A, and 18A are built in or provided in the projector 12A, the IWB 13A, and the MFP 14A, respectively. The short-range wireless apparatuses 16B, 17B, and 18B are built in or provided in the projector 12B, the IWB 13B, and the MFP 14B, respectively.

In a case where any one of the short-range wireless apparatuses 16A and 16B may be designated, it is called a short-range wireless apparatus 16. In a case where any one of the short-range wireless apparatuses 17A and 17B may be designated, it is called a short-range wireless apparatus 17.

In a case where any one of the short-range wireless apparatuses 18A and 18B may be designated, it is called a short-range wireless apparatus 18.

The collaboration processing system 1 is formed by connecting the information accumulating apparatus 10, the projectors 12A and 12B, the IWBs 13A and 13B, and the MFPs 14A and 14B to a network N3 such as a LAN. Further, in the collaboration processing system 1, the information accumulating apparatus 10 is connectable to a network N2 such as the Internet.

In the collaboration processing system 1 illustrated in FIG. 1, the projector 12A, the IWB 13A, and the MFP 14A are installed in a meeting room A, and the projector 12B, the IWB 13B, and the MFP 14B are installed in a meeting room B. In the collaboration processing system 1 illustrated in FIG. 1, the information accumulating apparatus 10 is installed other than the meeting rooms A and B. However, the information accumulating apparatus 10 may be installed in the meeting room A or B.

Further, in the collaboration processing system 1, a relay server 19 exists in the network N2 such as the Internet. Further, in the collaboration processing system 1, the smartphones 11a and 11b connectable to the network N1 such as the phone line exist. The smartphones 11a and 11b are connectable to the relay server 19 existing in the network N2 using the network N1. Further, the information accumulating apparatus 10 is connectable to the relay server 19 existing in the network N2.

For example, a phone line such as a 3G network can be used as the network N1. An intranet in a private environment such as an intercompany network can be used as the network N3. The relay server 19 existing in the network N2 can be omitted in a case where the smartphones 11a and 11b are directly connected to the information accumulating apparatus 10 through the networks N1 and N2.

The information accumulating apparatus 10 is an example of an information processing apparatus having an information sharing function. The information accumulating apparatus 10 performs a highly functional process which cannot be performed by the smartphones 11a and 11b, a process as a file server, and a process of acquiring a request from the smartphone 11a or 11b by connecting the information accumulating apparatus 10 to the relay server 19. Further, function of the information accumulating apparatus 10 may be distributed to multiple computers.

The smartphones 11a and 11b are an exemplary terminal apparatus operated by the user. The terminal apparatus may be the smartphones 11a and 11b, a mobile phone, a notebook PC, a tablet terminal, or the like, which can be operated by the user.

The projectors 12A and 12B, the IWBs 13A and 13B, and the MFPs 14A and 14B are examples of the electronic apparatus which is controlled by the smartphones 11a and 11b. The projectors 12A and 12B, the IWBs 13A and 13B, and the MFPs 14A and 14B provides an interface (IF) in the network N3.

The projectors 12A and 12B are examples of an image projection device. In a case where any one of the projectors 12A and 12B may be designated, it is called a projector 12. The projector 12 has a projection function and the communication function.

The IWBs 13A and 13B are examples of an image display apparatus. In a case where any one of the IWBs 13A and 13B may be designated, it is called an IWB 13. The IWB 13 has a display function and a communication function. The MFPs 14A and 14B are examples of the image forming apparatus. In a case where any one of the MFPs 14A and 14B may be designated, it is called a MFP 14. The MFP 14 has an image capturing function, an image forming function, and a communication function and can be used as a printer, a facsimile, a scanner, and a copier.

The short-range wireless apparatuses 16, 17, and 18 uses near-field wireless communication such as Bluetooth ("Bluetooth" is a registered trademark) and a near field communication (NFC) and provides apparatus information described later to the smartphone 11a or 11b.

In the collaboration processing system 1 illustrated in FIG. 1, the smartphone 11a and 11b exist in the meeting room A. In a case where any one of the smartphones 11a and 11b may be designated, it is called a smartphone 11. The smartphone 11 existing in the collaboration processing system 1 illustrated in FIG. 1 acquires the apparatus information described below from the short-range wireless apparatuses 16A, 17A, and 18A.

<Hardware Structure>
<<Computer>>

Figure 2:
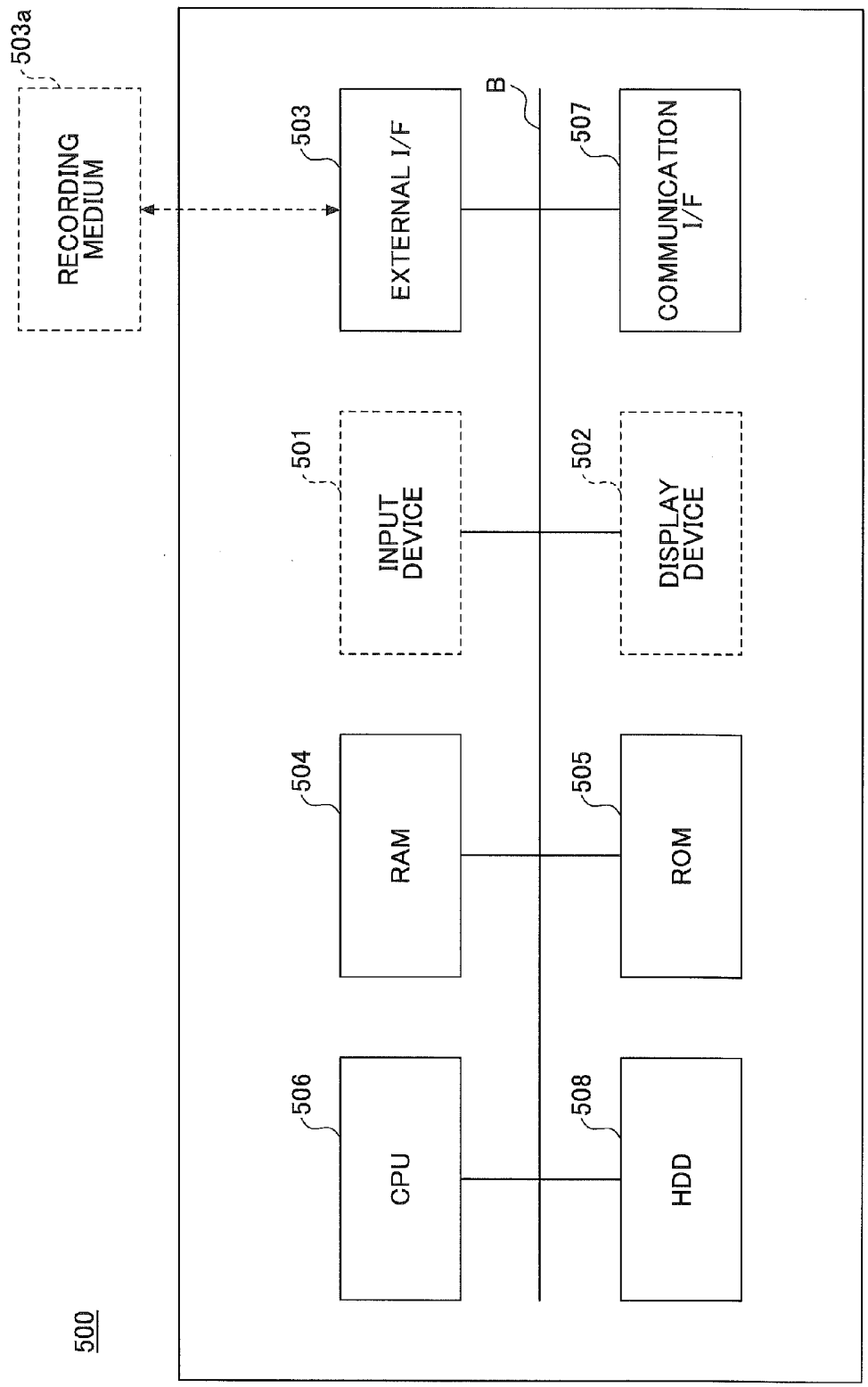
FIG. 2 illustrates an exemplary hardware structure of a computer of the embodiment.

The information accumulating apparatus 10 and the relay server 19 are substantialized by a computer having a hardware structure as illustrated in, for example, FIG. 2. FIG. 2 illustrates an exemplary hardware structure of the computer of the embodiment.

Referring to FIG. 2, the computer 500 includes an input device 501, a display device 502, an external I/F 503, a RAM 504, a ROM 505, a CPU 506, a communication I/F 507, a HDD 508, and so on, mutually connected by a bus B. It is acceptable to provide a structure such that the input device 501 and the display apparatus 502 may be connected to the bus B when necessary.

The input device 501 includes a keyboard, a mouse, a touch panel, and so on, by which the user can input various operation signals. The display device 502 includes a display or the like to display a processing result obtained by the computer 500.

The communication I/F 507 is an interface provided to connect the computer 500 with various networks. Thus, the computer 500 can perform data communications through the communication I/F 507.

The HDD 508 is an exemplary non-volatile memory device that stores a program and data. The stored program and data are an operating system (OS), which is basic software controlling the entire computer 500, application software (hereinafter, simply referred to as an "application") providing various functions in the OS, and so on. The computer 500 may use a drive device using a flash memory (e.g., a solid state drive (SSD)) as a recording medium in place of the HDD 508.

The external I/F 503 is an interface with an external apparatus. The external apparatus is a recording medium 503a or the like. With this, the computer 500 can read information from the recording medium 503a and/or write information to the recording medium 503a through the external I/F 503. The recording medium 503a is a flexible disk, a CD, a DVD, an SD memory card, a USB memory, or the like.

The ROM 505 is a non-volatile semiconductor memory (a memory device), which can hold a program and/or data even when a power source is powered off. The ROM 505 stores programs and data for a basic input/output system (BIOS), an OS setup, a network setup, and so on, which are executed at a time of booting up the computer 500. The RAM 504 is an example of a volatile semiconductor memory (a memory device) temporarily storing the program and/or the data.

The CPU 506 reads the program and/or the data from the memory device such as the ROM 505, the HDD 508, or the like. The read program or the read data undergo a process so as to substantialize a control or a function of the entire computer 500.

The information accumulating apparatus 10 and the relay server 19 are substantialized by a computer having a hardware structure as illustrated in, for example, FIG. 2.

<<Terminal Apparatus>>

Figure 3:
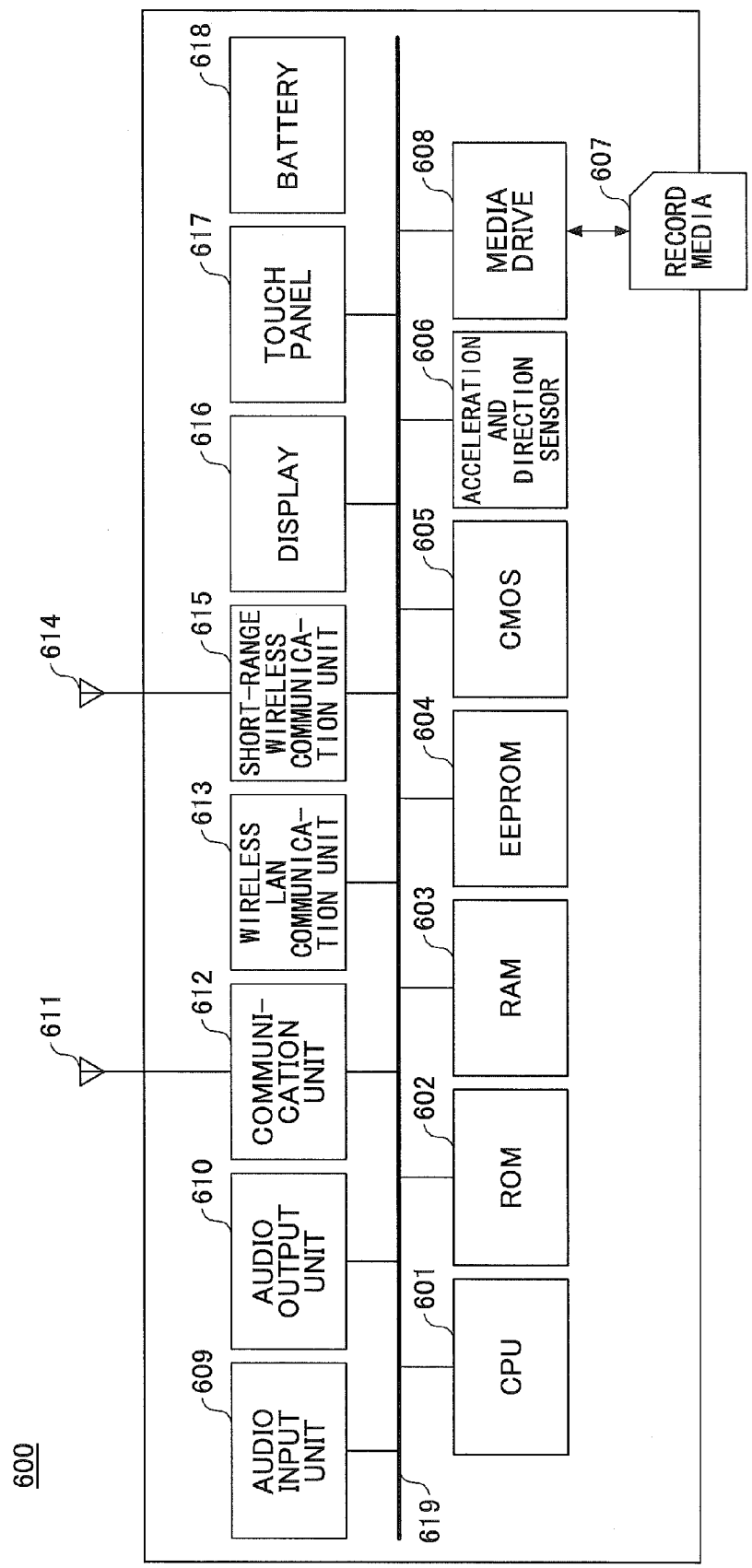
FIG. 3 illustrates an exemplary hardware structure of a terminal apparatus of the embodiment.

For example, the smartphone 11 is substantialized by a hardware structure illustrated in, for example, FIG. 3. FIG. 3 illustrates an exemplary hardware structure of the terminal apparatus of the embodiment. The terminal apparatus 600 illustrated in FIG. 3 includes a CPU 601, a ROM 602, a RAM 603, an EEPROM 604, a CMOS sensor 605, an acceleration and direction sensor 606, and a media drive 608.

The CPU 601 controls the entire operation of the terminal apparatus 600. The ROM 602 stores a basic input and output program. The RAM 603 is used as a work area of the CPU 601. The EEPROM 604 reads or writes data in conformity with a control of the CPU 601. The CMOS sensor 605 captures image data in conformity with the control of the CPU 601 to acquire image data. The acceleration and direction sensor 606 is an electromagnetic compass that detects earth magnetism, a gyrocompass, an acceleration sensor, or the like.

The media drive 608 controls read or write (store) of data from or to a record media 607 such as a flash memory. Data already recorded in the record media 607 are read out or new data are written in the record media 607. The record media 607 is freely attachable to or detachable from the media drive 608.

The EEPROM 604 stores an operating system (OS) executed by the CPU 601, association information necessary for a network setup, or the like. An application for performing various processes in the first embodiment is stored in the EEPROM 604, the record media 607, or the like.

The CMOS sensor 605 is a charge-coupled device that converts light to electric charges and digitizes an image of an object. The CMOS sensor 605 may be substituted by, for example, a charge coupled device (CCD) sensor as long as the image of the object can be captured.

Further, the terminal apparatus 600 includes an audio input unit 609, an audio output unit 610, an antenna 611, a communication unit 612, a wireless LAN communication unit 613, a short-range wireless communication antenna 614, a short-range wireless communication unit 615, a display 616, a touch panel 617, and a bus line 619.

The audio input unit 609 converts a sound to an audio signal. The audio output unit 610 converts the audio signal to the sound. The communication unit 612 uses the antenna 611 to communicate with the nearest base station apparatus by a wireless communication signal. The wireless LAN communication unit 613 performs a wireless LAN communication with an access point in conformity with the standard IEEE 80411. The short-range wireless communication unit 615 performs short-range wireless communication using the short-range wireless communication antenna 614.

The display 616 is provided to display the image of the object, various icons, or the like. The display 616 is made of a liquid crystal, an organic EL, or the like. The touch panel 617 is mounted on the display 616 and is formed of a panel of a pressure sensitive type or a static type. A touch position on the display 616 is detected by a touch of a finger or a touch pen. The bus line 619 is an address bus, a data bus, or the like for electrically connecting the above units and parts.

The terminal apparatus 600 includes a battery 618 for a dedicated use. The terminal apparatus 600 is driven by the battery 618. The audio input unit 609 includes a microphone for inputting the sound. The audio output unit 610 includes a speaker for outputting the sound.

The smartphone 11 can substantialize various processes described below with a hardware structure of the terminal apparatus 600 illustrated in, for example, FIG. 3.

<<Projector>>

Figure 4:
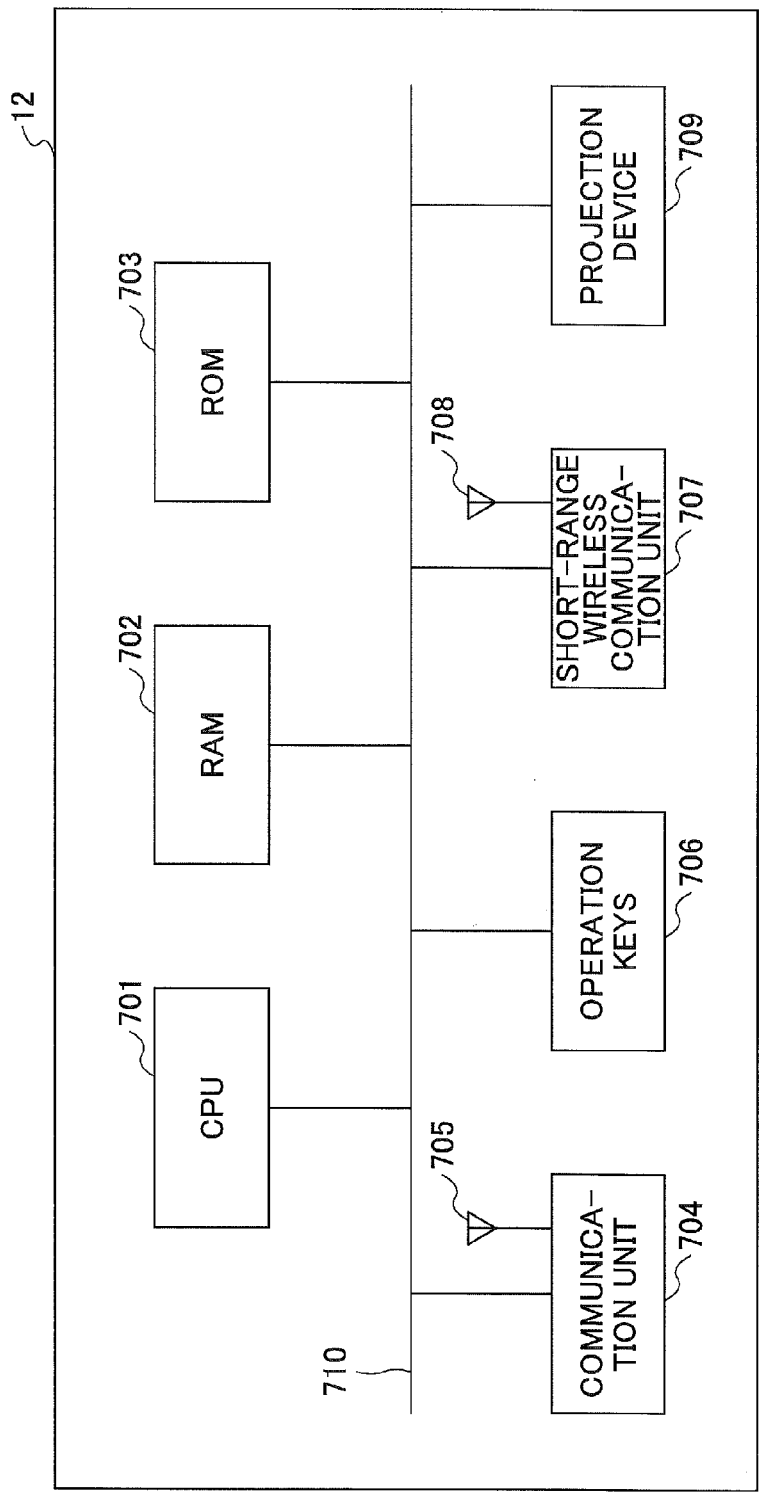
FIG. 4 illustrates an exemplary hardware structure of a projector of the embodiment.

The hardware structure of the projector 12 is described as an exemplary hardware structure of the electronic apparatus. The projector 12 is substantialized by a computer having the hardware structure as illustrated in, for example, FIG. 4. FIG. 4 illustrates an exemplary hardware structure of the projector of the first embodiment.

Referring to FIG. 4, the projector 12 includes a CPU 701, a RAM 702, a ROM 703, a communication unit 704, an antenna 705, operation keys 706, a short-range wireless communication unit 707, a short-range wireless communication antenna 707, a projection device 709, and a bus line 710.

The CPU 701 controls operations of the entire projector 12. The RAM 702 is used as a work area of the CPU 701. The ROM 703 stores a basic input and output program.

The communication unit 704 uses the antenna 705 to communicate with the nearest base station apparatus or the nearest access point by a wireless communication signal. The communication unit 704 may perform data communications with the network N3 by a wired communication signal. The operation keys 706 is a hard key or the like provided to the projector 12. The short-range wireless communication unit 707 performs short-range wireless communication using the short-range wireless communication antenna 708. The projection device 709 projects (outputs) an output target file whose output request is received.

<Software Structure>

<<Smartphone>>

Figure 5:
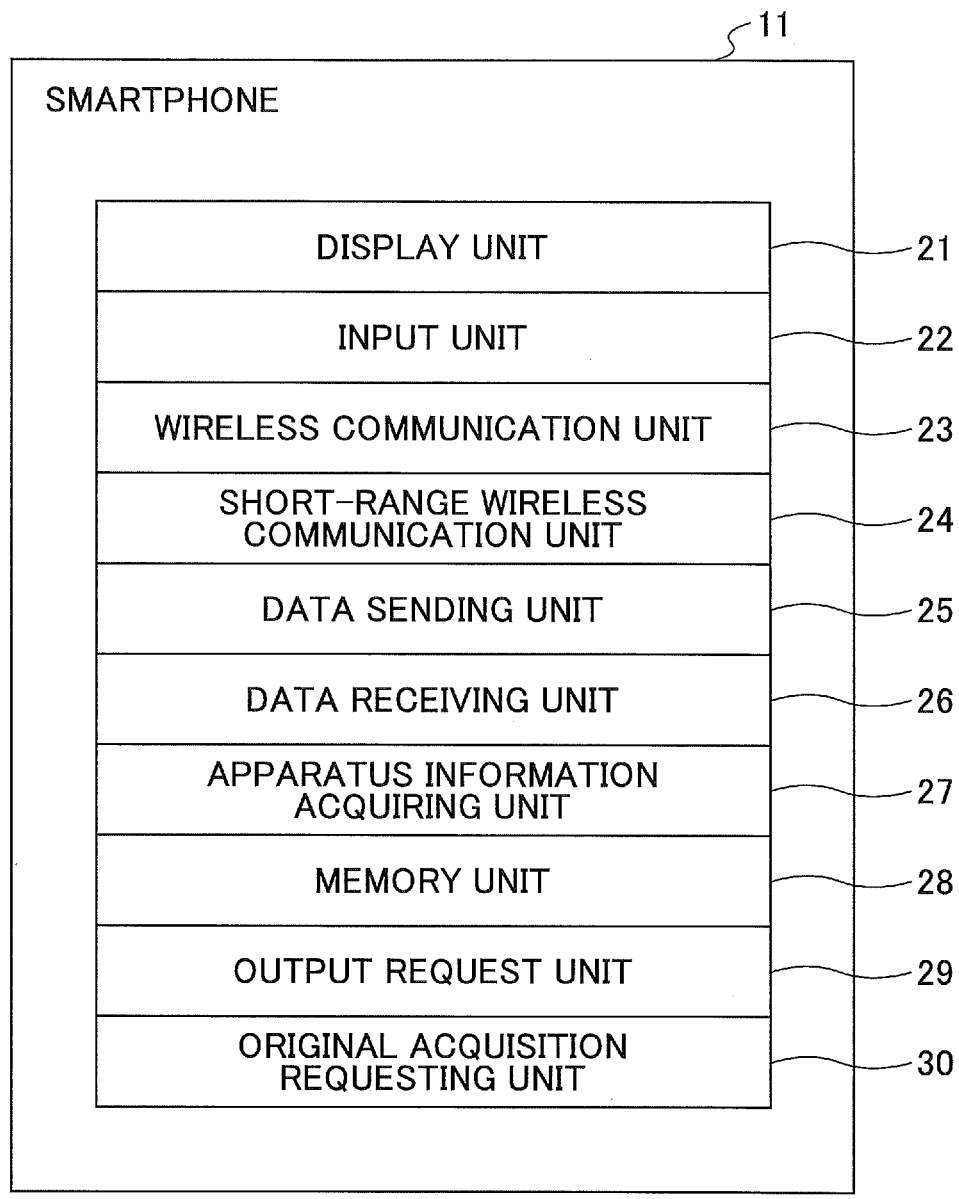
FIG. 5 is an exemplary processing block chart of a smartphone of the embodiment.

The smartphone 11 of the first embodiment is substantialized by the processing block illustrated in, for example, FIG. 5. FIG. 5 is an exemplary processing block chart of the smartphone of the embodiment. The smartphone 11 substantializes a display unit 21, an input unit 22, a wireless communication unit 23, a short-range wireless communication unit 24, a data sending unit 25, a data receiving unit 26, an apparatus information acquiring unit 27, a memory unit 28, an output request unit 29, an original acquisition requesting unit 30 by installing a program and running the program.

The display unit 21 controls a screen displayed on the display 616. The input unit 22 receives an operation of inputting into the touch panel 617 by the user. The wireless communication unit 23 performs wireless communication using the communication unit 612 and the wireless LAN communication unit 613. The short-range wireless communication unit 24 performs short-range wireless communication using the short-range wireless communication unit 615.

The data sending unit 25 sends data (a file) using wireless communication. The data receiving unit 26 receives data (a file) using the wireless communication. The apparatus information acquiring unit 27 uses the short-range wireless communication unit 24 and acquires the apparatus information (described later) from the short-range wireless apparatus 16, 17, or 18. The memory unit 28 stores the acquired apparatus information described below.

The output request unit 29 uses the apparatus information (described below) and sends a file output request (a request) requesting the electronic apparatus such as the projector 12 to output the file to the information accumulating apparatus 10 through the relay server 19. The original acquisition requesting unit 30 uses the apparatus information (described below) and sends a request to acquire an original of a file currently being output by the electronic apparatus such as the projector 12 to the information accumulating apparatus 10 through the relay server 19. The request to acquire the original is a request to acquire a file (the original) having an original data form before converting to a data form enabled to be output by the electronic apparatus.

<<Information Accumulating Apparatus>>

Figure 6:
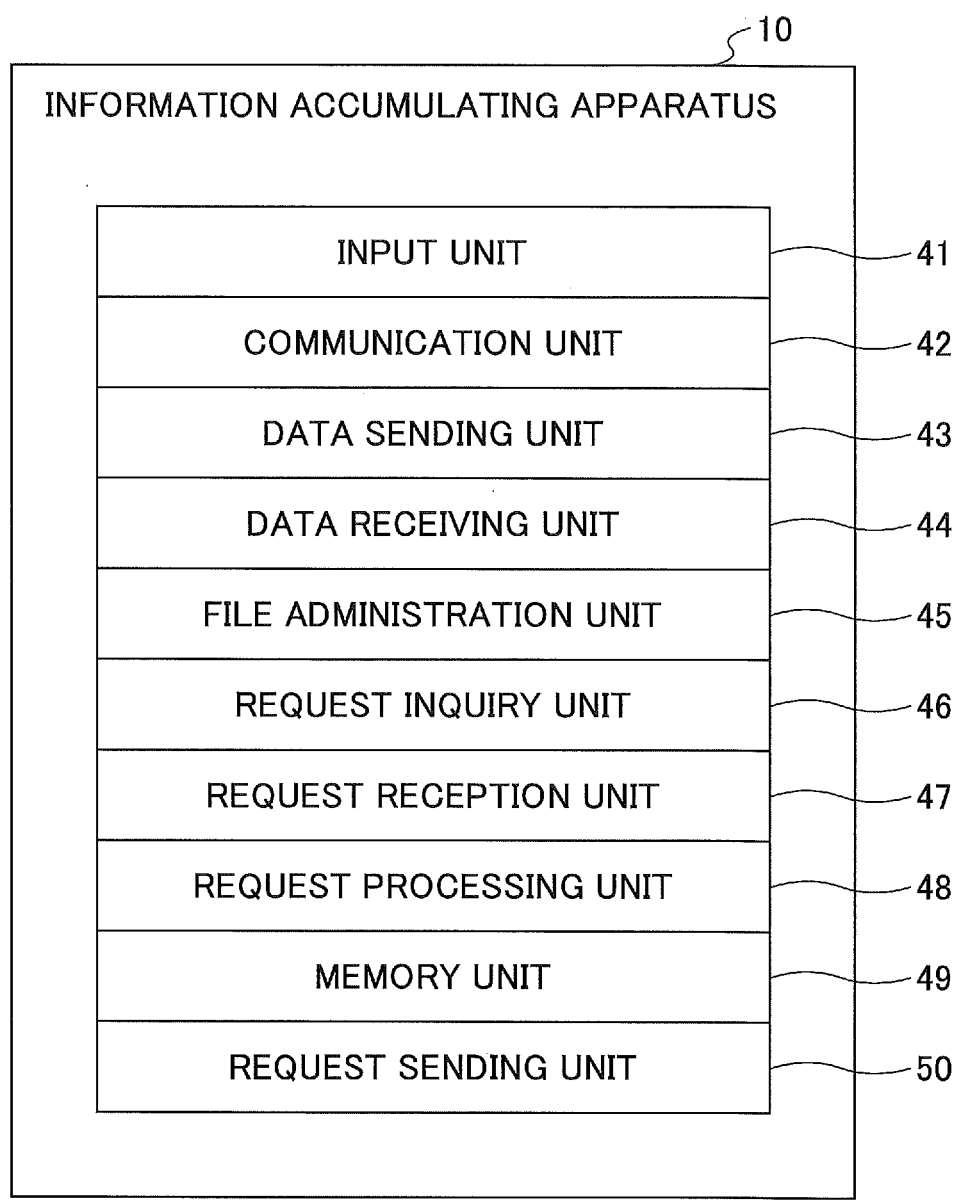
FIG. 6 is an exemplary processing block chart of the information accumulating apparatus of the embodiment.

The information accumulating apparatus 10 of the first embodiment is substantialized by a processing block chart illustrated in, for example, FIG. 6. FIG. 6 is an exemplary processing block chart of the information accumulating apparatus of the first embodiment. The information accumulating apparatus 10 substantializes an input unit 41, a communication unit 42, a data sending unit 43, a data receiving unit, a file administration unit 45, a request inquiry unit 46, a request reception unit 47, a request processing unit 48, a memory unit 49, a request sending unit 50 by running a program.

The input unit 41 receives an input operation of inputting into the input device 501 by the user. The communication unit 42 performs communications through the communication I/F 507. The data sending unit 43 sends data (a file) using the communication. The data receiving unit 44 receives data using the communication. The file administration unit 45 administers a shared folder unveiled on the networks N2 and N3 using a server message block (SMB) protocol and converts the data form of the file (the file conversion) when necessary. The file administration unit 45 can store the file in association with the apparatus information described later. The file of the first embodiment is one mode of the data.

The request inquiry unit 46 inquires of the relay server 19 whether there is a request to the request inquiry unit 46. The request reception unit 47 performs a process of receiving a request (an HTTP request) of the smart phone 11 from the relay server 19. The request processing unit 48 performs a process corresponding the received request (the HTTP request) received from the smartphone 11. The memory unit 49 stores the shared folder. The request sending unit 50 performs a process of sending a request to the electronic apparatus such as the projector 12.

<<Projector>>

Figure 7:
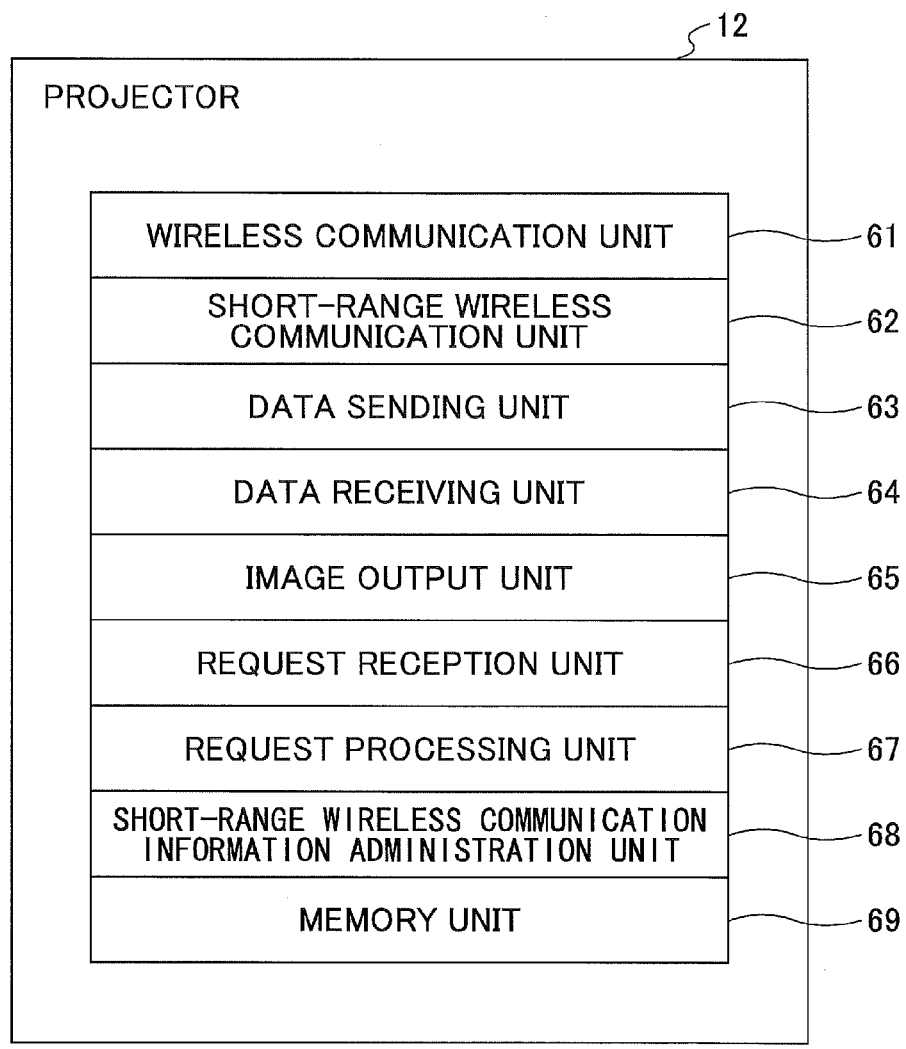
FIG. 7 is an exemplary processing block chart of the projector of the embodiment.

The projector 12 of the first embodiment is substantialized by a processing block illustrated in, for example, FIG. 7. FIG. 7 is an exemplary processing block chart of the projector of the first embodiment. The projector 12 substantializes a wireless communication unit 61, a short-range wireless communication unit 62, a data sending unit 63, a data receiving unit 64, an image output unit 65, a request reception unit 66, a request processing unit 67, a short-range wireless communication information administration unit 68, and a memory unit 69 by running a program.

The wireless communication unit 61 performs the wireless communication using the communication unit 704. The short-range wireless communication unit 62 performs short-range wireless communication using the short-range wireless communication unit 707. The data sending unit 63 sends data (a file) using the wireless communication. The data receiving unit 64 receives data (the file) using the wireless communication.

The image output unit 65 performs an image output (projection) of the received data (the file). The request reception unit 66 performs a process of receiving a request of the smart phone 11 from the information accumulating apparatus 10. The request processing unit 67 performs a process corresponding to the received request. The short-range wireless communication information administration unit 68 administers the apparatus information described later.

The apparatus information administered by the short-range wireless communication information administration unit 68 includes connection information such as the MAC address and the IP address of the projector 12 and original tracking information of a file currently being output by the projector 12. The memory unit 69 stores the apparatus information.

<Detailed Process>

Hereinafter, a detailed process of the collaboration processing system 1 of the first embodiment is described.

<<Acquisition of Apparatus Information>>

Figure 8:
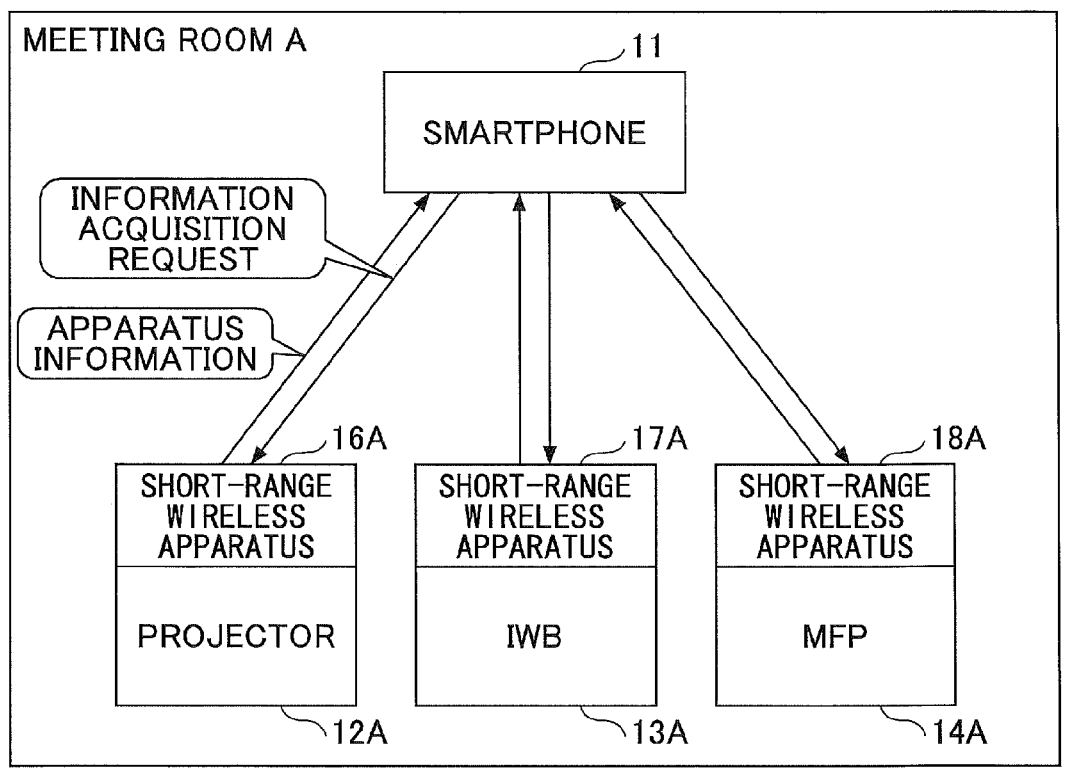
FIG. 8 is an exemplary block chart for explaining a procedure of acquiring apparatus information.

In the collaboration processing system 1 illustrated in FIG. 1, the smartphone 11 acquires the apparatus information as illustrated in, for example, FIG. 8. FIG. 8 is an exemplary block chart for explaining a procedure of acquiring the apparatus information. In the collaboration processing system 1 illustrated in FIG. 1, short-range wireless apparatuses 16A to 18A are installed in a projector 12A, an IWB 13A, and a MFP 14A, which are installed in the meeting room A, respectively. The short-range wireless apparatus 16A stores the apparatus information illustrated in, for example, FIG. 9.

FIG. 9 illustrates an exemplary structure of the apparatus information stored by the short-range radio apparatus. The apparatus information illustrated in FIG. 9 is exemplary apparatus information of the projector 12A installed in the meeting room A. The apparatus information of the projector 12A illustrated in FIG. 9 includes the connection information of the projector 12A and the original tracking information of the file currently being output by the projector 12.

Referring to FIG. 9, an IP address, a host name, a MAC address, an apparatus type, a meeting room, and an apparatus ID are illustrated as exemplary connection information of the projector 12A. The connection information of the projector 12A includes information for identifying the projector 12A, information for connecting to the projector 12A, and information for identifying the meeting room.

Referring to FIG. 9, the IP address, the host name, the MAC address, the apparatus type, the meeting room, and a file path are illustrated as exemplary original tracking information of the file currently being output by the projector 12. The original tracking information of the file currently being output by the projector 12 includes the connection information of the information accumulating apparatus 10 which stores the original of the file currently being output by the projector 12 and a file path of the original of the file currently being output by the projector 12.

Referring to FIG. 9, the IP address, the host name, the MAC address, the apparatus type, and the meeting room are illustrated as exemplary connection information of the information accumulating apparatus 10. The connection information of the information accumulating apparatus 10 includes information for identifying the information accumulating apparatus 10, information for connecting the information accumulating apparatus 10, and information for identifying the meeting room. Because FIG. 9 illustrates a state before storing the original of the file in the information accumulating apparatus 10, a column indicating the original tracking information is blank.

The smartphone 11 can acquire the apparatus information of the projector 12A illustrated in FIG. 9 from the short-range wireless apparatus 16A as illustrated in FIG. 9 by requesting the short-range wireless apparatus 16A to send the apparatus information.

Similarly, the smartphone 11 can acquire the apparatus information of the IWB 13A and the MFP 14A from the short-range wireless apparatus 16A by requesting the short-range wireless apparatus 16A to send the apparatus information. The apparatus information of the IWB 13A and the MFP 14A is omitted from illustration.

As described, in the collaboration processing system 1 of the first embodiment, the apparatus information can be acquired from the short-range wireless apparatuses 16 to 18. Therefore, it is possible to permit a control of the electronic apparatus using the smartphone 11 in a limited space such as the meeting room.

Further, in the collaboration processing system 1 of the first embodiment, the apparatus information can be acquired from the short-range wireless apparatuses 16 to 18. Therefore, it is possible to prevent a user from spending a labor of inputting the apparatus information into the smartphone.

<<Output of File and Acquisition of Original>>

Hereinafter, described is a process where the smartphone 11b acquires the original of the file currently being output by the projector 12A upon a request of the smartphone 11a. However, the original of the file currently being output may be output from the electronic apparatus other than the projector 12A.

Figure 10:
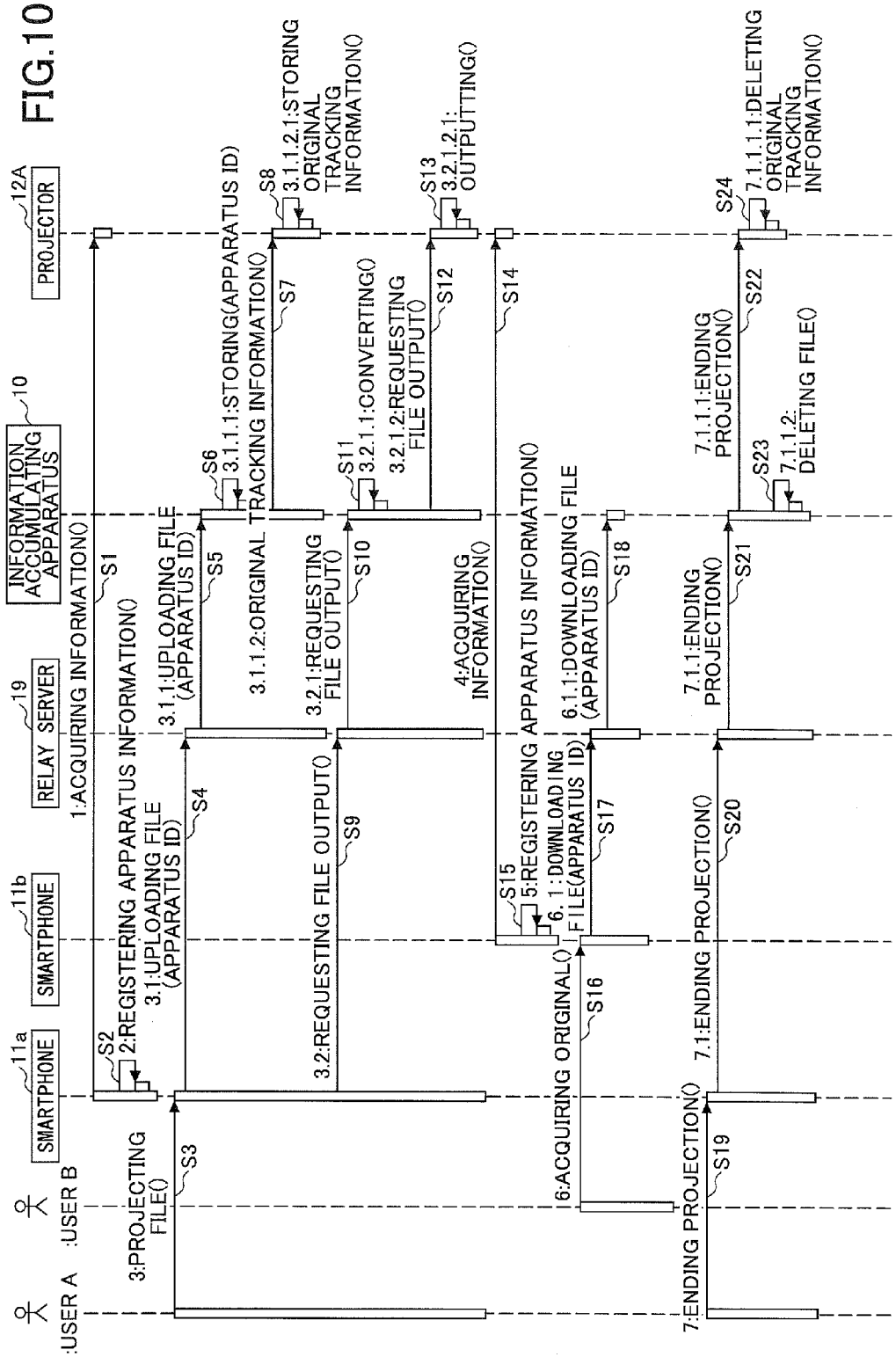
FIG. 10 is a sequence chart of an exemplary process of projecting a file and acquiring an original in a collaboration processing system of the embodiment.

FIG. 10 is a sequence chart of an exemplary process of projecting the file and acquiring the original in the collaborate processing system of the embodiment. Referring to FIG. 10, the smartphone 11a is operated by the user A and the smartphone 11b is operated by the user B.

In step S1, the apparatus information acquiring unit 27 of the smartphone 11a acquires the apparatus information of the projector 12A illustrated in FIG. 9 from the short-range wireless apparatus 16A. In step S2, the memory unit 28 of the smartphone 11a stores (registers) the apparatus information of the projector 12A acquired by the apparatus information acquiring unit 27.

In step S3, the input unit 22 of the smartphone 11a receives an input operation for projecting the file from the user A. In steps S4 and S5, the data sending unit 25 of the smartphone 11a uploads the file to be projected along with the apparatus ID of the projector 12A read out of the apparatus information of the projector 12A to the information accumulating apparatus 10 through the relay server 19. Here, the registration (pairing) of the smartphone 11a into, for example, the information accumulating apparatus 10 ends and the smartphone 11a already acquires the connection information for connecting the information accumulating apparatus 10.

The upload process in step S5 may be performed as described below. The information accumulating apparatus 10 inquires of the relay server 19 whether there is the request to the information accumulating apparatus 10. The information accumulating apparatus 10 receives the request (for the apparatus ID of the projector 12A and the file to be projected described above) sent in response to the inquiry from the relay server 19 through the relay server 19. With this structure, even in a case where the smartphone 11a and the information accumulating apparatus 10 are connected to different networks and the intranet connected to the information accumulating apparatus 10 is protected by a firewall, it is possible to receive the request, the data, and the information sent from the smartphone 11a by the information accumulating apparatus 10.

In step S6, the file administration unit 45 of the information accumulating apparatus 10 stores the file to be projected in association with the apparatus ID of the projector 12A. In step S7, the request processing unit 48 of the information accumulating apparatus 10 requests to register the original tracking information including the stored file path to be projected.

In step S8, the short-range wireless communication information administration unit 68 of the projector 12A registers the original tracking information including the file path of the file to be projected as illustrated in FIG. 11 in the apparatus information of the projector 12A illustrated in FIG. 9. FIG. 11 illustrates an exemplary structure of the apparatus information in which the original tracking information is registered. Thus, using the apparatus information of the projector 12A illustrated in FIG. 11, the projector 12A can provide the original tracking information being projected by the projector 12A to the smartphone 11b or the like from the short-range wireless apparatus 16A.

In steps S9 and S10, the output request unit 29 of the smartphone 11a uses the apparatus information of the projector 12A illustrated in FIG. 9 to send a file output request for the projector 12A through the relay server 19 to the information accumulating apparatus 10. In step S11, the file administration unit 45 of the information accumulating apparatus 10 converts a data form of the file to be projected to a data form capable of being projected by the projector 12A. The conversion of the data form of the file to be projected in step S11 is performed when necessary.

In step S12, the request sending unit 50 of the information accumulating apparatus 10 sends a file output request of outputting the file to be projected to the projector 12A. In step S13, the image output unit 65 of the projector 12A projects the file to be projected in response to the file output request received from the information accumulating apparatus 10.

The request processing unit 48 of the information accumulating apparatus 10 may cause the memory unit 49 to store request information as illustrated in FIG. 12 so as to administer an output request requested from the smartphone 11a or the like. FIG. 12 illustrates a structure of exemplary request information. The request information illustrated in FIG. 12 includes data items such as a request destination, an output start time, an output end time, an output file, a request source, and so on. By the request information illustrated in FIG. 12, the information accumulating apparatus 10 can administers the request source, the request destination, the output file, and so on of the file output request.

In step S14, the apparatus information acquiring unit 27 of the smartphone 11b acquires the apparatus information of the projector 12A illustrated in FIG. 11 from the short-range wireless apparatus 16A. In step S15, the memory unit 28 of the smartphone 11b stores (registers) the apparatus information of the projector 12A acquired by the apparatus information acquiring unit 27. Thus, the smartphone 11b can acquire the original tracking information of the file currently being projected by the projector 12A from the short-range wireless apparatus 16A.

Figure 13:
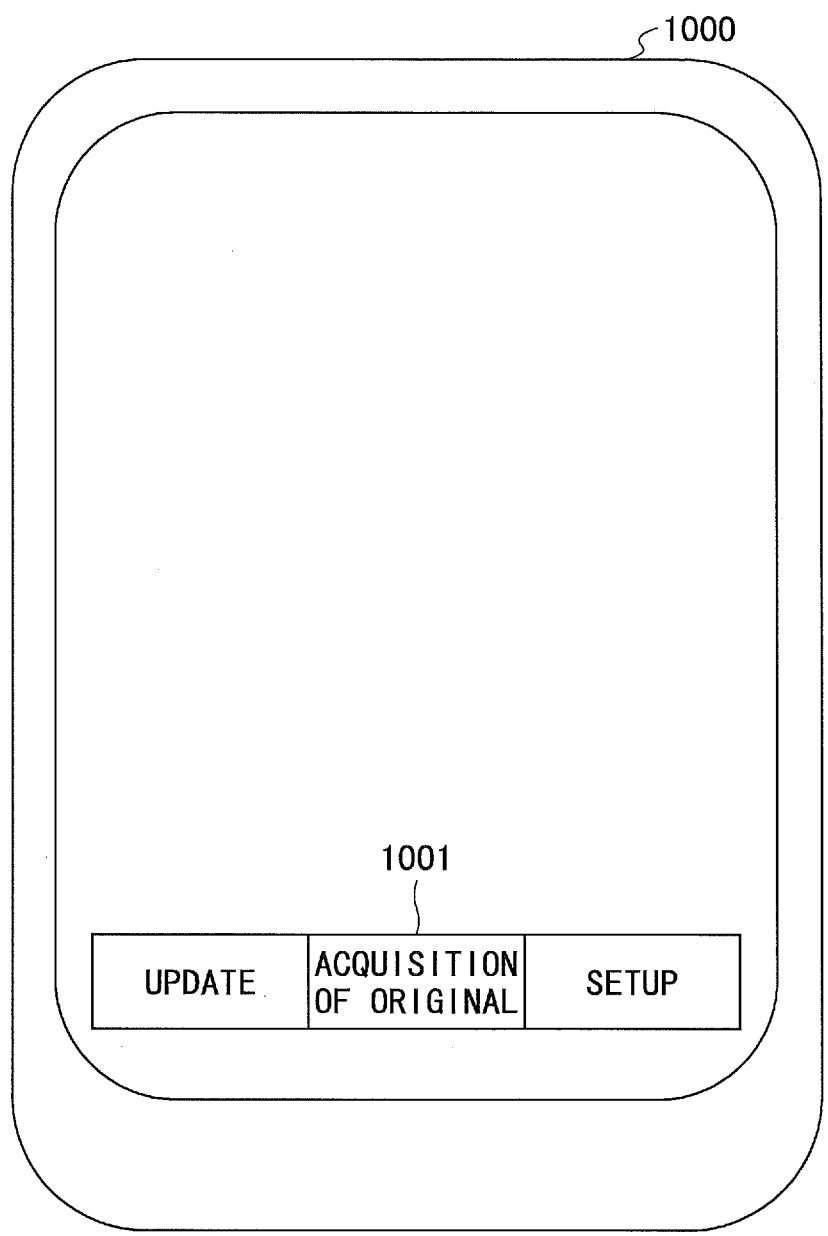
FIG. 13 illustrates an image of an exemplary UI receiving an acquisition of an original from a user.

In step S16, the display unit 21 of the smartphone 11b displays a user interface (UI) as illustrated in FIG. 13 on the display 616 and receives an input operation for acquiring the original operated by the user B from the touch panel 617.

FIG. 13 illustrates an image of an exemplary UI receiving an acquisition of the original from the user. On the UI 1000 illustrated in FIG. 13, a button 1001 for selecting the acquisition of the original is provided. When the user B pushes the button 1001 for the acquisition of the original, the user can perform an input operation for the acquisition of the original.

Figure 14:
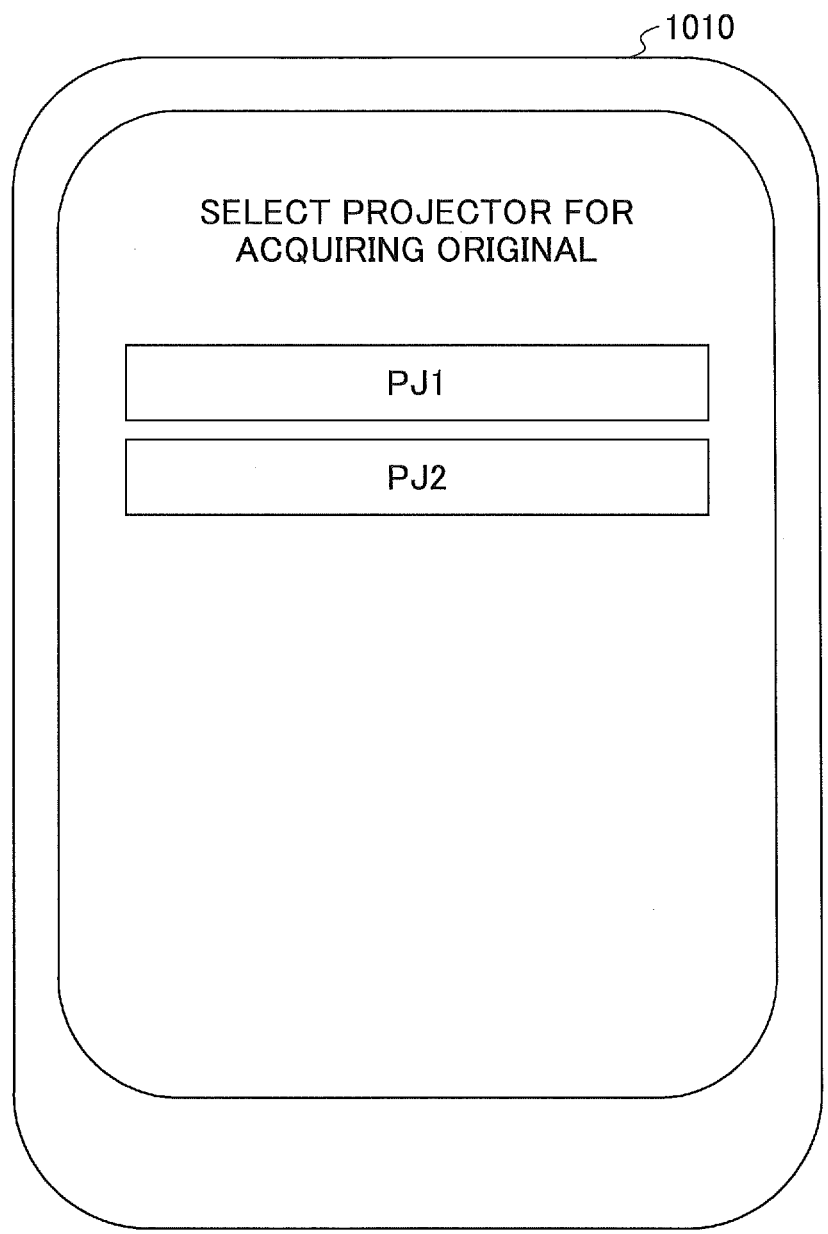
FIG. 14 illustrates an image of an exemplary UI receiving a selection of the projector from the user.

In a case where the apparatus information of multiple projectors is stored in the memory unit 28, the smartphone 11b may display the UI 1010 illustrated in FIG. 14 on the display 616 so as to receive the input operation of selecting the projector from the user B. FIG. 14 illustrates the image of the exemplary UI receiving the selection of the projector from the user. Referring to FIG. 14, the UI 1010 displays the apparatus type of the electronic apparatus so as to enable the projector 12, from which the original of the currently projected file is acquired, to be selected. However, a thumbnail image may be acquired using the file path of the original tracking information and the acquired thumbnail image may be additionally displayed on the UI 1010, for example.

The original acquisition requesting unit 30 of the smartphone 11b reads the original tracking information out of the apparatus information of the projector 12A illustrated in FIG. 11 and stored in the memory unit 28. In steps S17 and S18, the original acquisition requesting unit 30 uses the original tracking information and requests to download the file currently being output by the projector 12A along with the apparatus ID of the projector 12A read out of the apparatus information of the projector 12A.

The data sending unit 43 of the information accumulating apparatus 10 receiving the file download request from the smartphone 11b sends the original of the file currently being output by the projector 12A to the smartphone 11b. The information accumulating apparatus 10 may improve security by determining whether the download is permitted for the smartphone 11b before the projector 12A sends the original of the file currently being output by the projector 12A to the smartphone 11b.

It may be set whether the download of the original of the file currently being output by the projector 12A is permitted for the smartphone 11b at a time when the user A preforms the input operation for the projection of the file in, for example, step S3.

The smartphone 11b, which cannot be connected to the network N3 connected to the projector 12A, can easily acquire the original of the file currently being output by the projector 12A.

In step S19, the input unit 22 of the smartphone 11a receives an input operation for ending the projection of the file from the user A. In steps S20 and S21, the output request unit 29 of the smartphone 11a uses the apparatus information of the projector 12A illustrated in FIG. 9 to send a projection end request for the projector 12A through the relay server 19 to the information accumulating apparatus 10.

In step S22, the request sending unit 50 of the information accumulating apparatus 10 sends the projection end request to the projector 12A. In step S23, the file administration unit 45 of the information accumulating apparatus 10 deletes the file to be projected stored in association with the apparatus ID of the projector 12A in step S6. In step S24, the short-range wireless communication information administration unit 68 of the projector 12A deletes the original tracking information included in the apparatus information of the projector 12A.

In a case where a short-range communication between the short-range wireless communication information administration unit 68 of the projector 12A and the smartphone 11a is cut off, original tracking information included in the apparatus information of the projector 12A illustrated in FIG. 11 may be deleted to improve the security.

Second Embodiment

In the collaboration processing system 1 of the second embodiment, a guest ID generating unit 70 is added to the projector 12 and this projector 12 is used. In the collaboration processing system 1 of the second embodiment, the security can be reinforced by adding a guest ID generated by the guest ID generating unit 70 of the projector 12 to the apparatus information of the projector 12. Explanation of a second embodiment for the same portion as that in the first embodiment is omitted.

Figure 15:
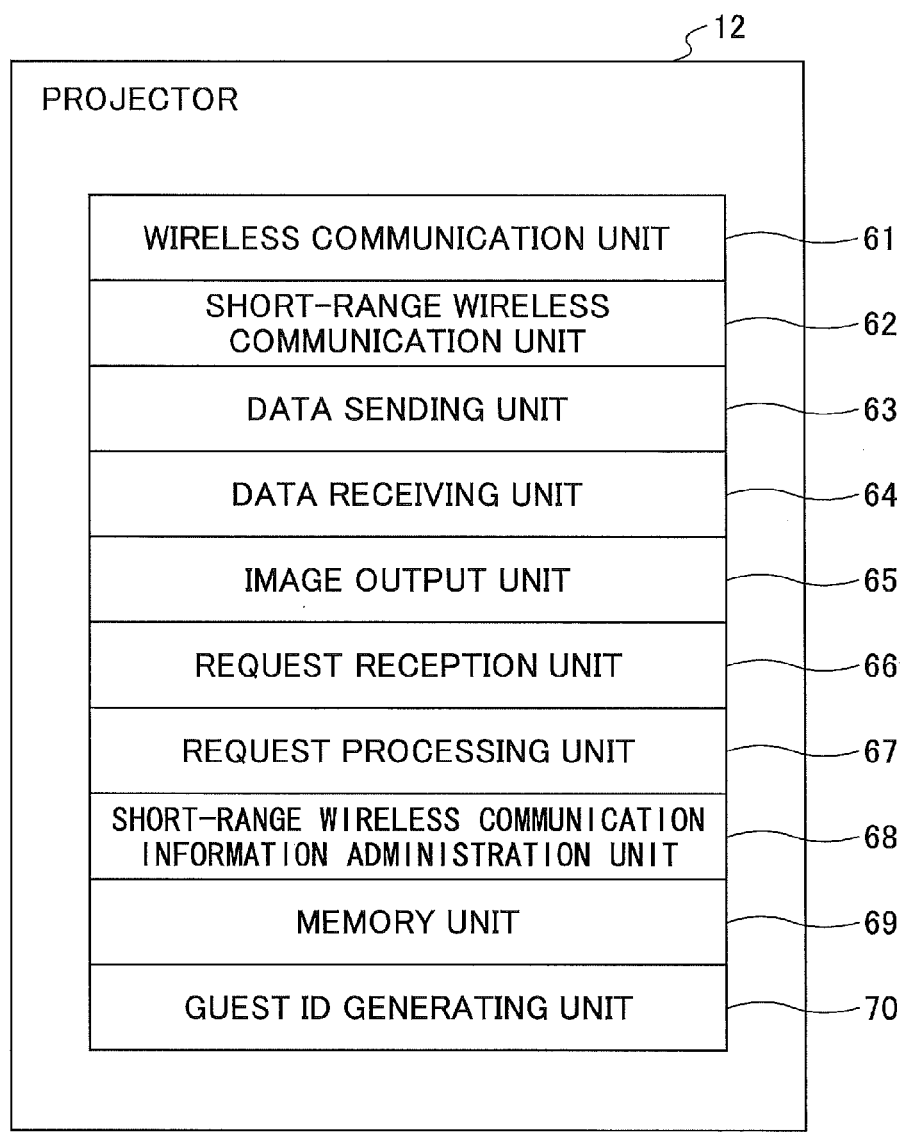
FIG. 15 is another exemplary processing block chart of the projector of the embodiment.

FIG. 15 is another exemplary processing block chart of the projector of the second embodiment. The projector 12 illustrated FIG. 15 is formed by adding the guest ID generating unit 70 to the structure of the projector 12 illustrated in FIG. 7. The guest ID generating unit 70 generates a random guest ID when the request reception unit 66 receives a request for generating a guest ID.

The short-range wireless apparatus 16A of the projector 12A stores the apparatus information illustrated in, for example, FIG. 16. FIG. 16 illustrates another exemplary structure of the apparatus information stored by the short-range radio apparatus. The apparatus information illustrated in FIG. 16 is formed by adding the guest ID to the apparatus information illustrated in FIG. 9. Because FIG. 16 illustrates a state before storing the original of the file in the information accumulating apparatus 10, a column indicating the original tracking information is blank. As illustrated in the apparatus information of FIG. 16, the guest ID is included in the original tracking information. Therefore, in the collaboration processing system 1 of the second embodiment, when the original of the file projected by the projector 12A is acquired, the guest ID generated by the guest ID generating unit 70 of the projector 12 is necessary.

Hereinafter, described is a process where the smartphone 11b acquires the original of the file currently being output by the projector 12A upon a request of the smartphone 11a. However, the original of the file currently being output may be output from the electronic apparatus other than the projector 12A.

Figure 17:
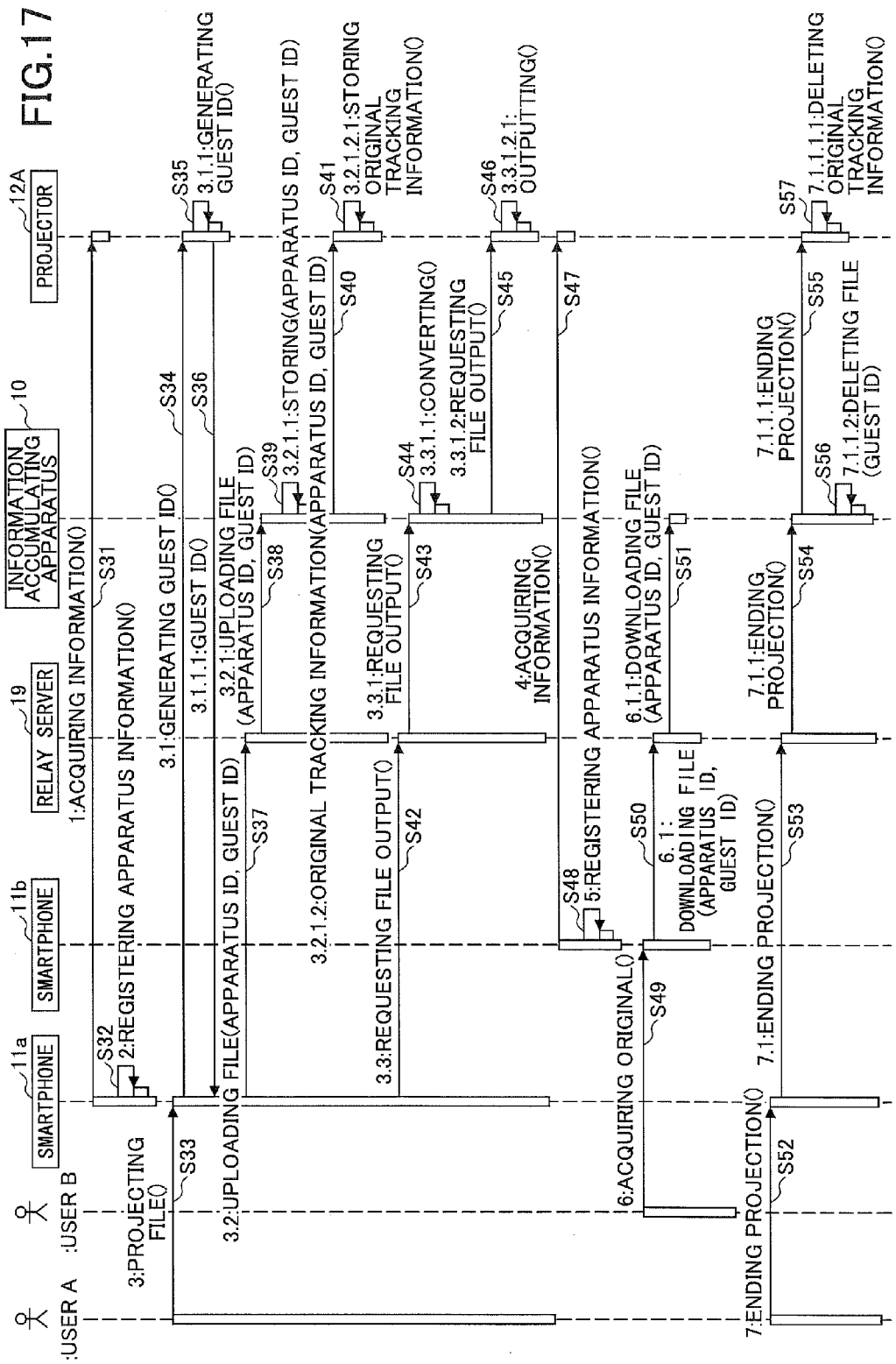
FIG. 17 is a sequence chart of another exemplary process of projecting the file and acquiring the original in the collaboration processing system of the embodiment.

FIG. 17 is a sequence chart of another exemplary process of projecting the file and acquiring the original in the collaborate processing system of the embodiment. Referring to FIG. 17, the smartphone 11a is operated by the user A and the smartphone 11b is operated by the user B.

In step S31, the apparatus information acquiring unit 27 of the smartphone 11a acquires the apparatus information of the projector 12A illustrated in FIG. 16 from the short-range wireless apparatus 16A. In step S32, the memory unit 28 of the smartphone 11a stores (registers) the apparatus information of the projector 12A acquired by the apparatus information acquiring unit 27.

In step S33, the input unit 22 of the smartphone 11a receives an input operation for projecting the file from the user A. In step S34, the output request unit 29 of the smartphone 11a requests the guest ID generating unit 70 of the projector 12A to generate the guest ID. In step S35, the guest ID generating unit 70 generates the guest ID. In step S36, the short-range wireless communication unit 62 of the projector 12A sends the guest ID to the smartphone 11a.

The data sending unit 25 of the smartphone 11a reads the apparatus ID of the projector 12A from the apparatus information of the projector 12A. In steps S37 and S38, the data sending unit 25 of the smartphone 11a uploads the file to be projected along with the apparatus ID of the projector 12A and the guest ID through the relay server 19.

In step S39, the file administration unit 45 of the information accumulating apparatus 10 stores the file to be projected in association with the apparatus ID of the projector 12A and the guest ID. In step S40, the request processing unit 48 of the information accumulating apparatus 10 requests to register the original tracking information including the stored file path to be projected and the guest ID.

In step S41, the short-range wireless communication information administration unit 68 of the projector 12A registers the original tracking information including the file path of the file to be projected and the guest ID in the apparatus information of the projector 12A as illustrated in FIG. 18. FIG. 18 illustrates another exemplary structure of the apparatus information in which the original tracking information is registered.

Thus, using the apparatus information of the projector 12A illustrated in FIG. 18, the projector 12A can provide the original tracking information being projected by the projector 12A to the smartphone 11b or the like from the short-range wireless apparatus 16A.

In steps S42 and S43, the output request unit 29 of the smartphone 11a uses the apparatus information of the projector 12A illustrated in FIG. 16 to send a file output request for the projector 12A through the relay server 19 to the information accumulating apparatus 10. In step S44, the file administration unit 45 of the information accumulating apparatus 10 converts a data form of the file to be projected to a data form capable of being projected by the projector 12A. The conversion of the data form of the file to be projected in step S44 is performed when necessary.

In step S45, the request sending unit 50 of the information accumulating apparatus 10 sends a file output request of outputting the file to be projected to the projector 12A. In step S46, the image output unit 65 of the projector 12A projects the file to be projected in response to the file output request received from the information accumulating apparatus 10.

In step S47, the apparatus information acquiring unit 27 of the smartphone 11b acquires the apparatus information of the projector 12A illustrated in FIG. 18 from the short-range wireless apparatus 16A. In step S48, the memory unit 28 of the smartphone 11b stores (registers) the apparatus information of the projector 12A acquired by the apparatus information acquiring unit 27. Thus, the smartphone 11b can acquire the original tracking information of the file currently being projected by the projector 12A from the short-range wireless apparatus 16A.

In step S49, the display unit 21 of the smartphone 11b displays the UI 1000 as illustrated in FIG. 13 on the display 616 and receives an input operation for acquiring the original operated by the user B from the touch panel 617.

The original acquisition requesting unit 30 of the smartphone 11b reads the original tracking information out of the apparatus information of the projector 12A illustrated in FIG. 18 and stored in the memory unit 28. In steps S50 and S51, the original acquisition requesting unit 30 uses the original tracking information and requests to download the file currently being output by the projector 12A along with the apparatus ID of the projector 12A read out of the apparatus information of the projector 12A and the guest ID.

The data sending unit 43 of the information accumulating apparatus 10 receiving the file download request from the smartphone 11b sends the original of the file currently being output by the projector 12a to the smartphone 11b.

Therefore, in a case where the smartphone 11b exists within a communication range of the short-range wireless apparatus 16A and cannot be connected to the network N3 connected to the projector 12A, the smartphone 11b can easily acquire the original of the file currently being projected by the projector 12A.

In step S52, the input unit 22 of the smartphone 11a receives an input operation for ending the projection from the user A. In steps S53 and S54, the output request unit 29 of the smartphone 11a uses the apparatus information of the projector 12A illustrated in FIG. 16 to send a projection end request for the projector 12A through the relay server 19 to the information accumulating apparatus 10.

In step S55, the request-sending unit 50 of the information accumulating apparatus 10 sends the projection end request to the projector 12A. In step S56, the file administration unit 45 of the information accumulating apparatus 10 deletes the file to be projected stored in association with the apparatus ID of the projector 12A and the guest ID in step S39. In step S57, the short-range wireless communication information administration unit 68 of the projector 12A deletes the original tracking information included in the apparatus information of the projector 12A illustrated in FIG. 18.

Third Embodiment

In the collaboration processing system 1 of a third embodiment, the file currently being projected by the projector 12A upon a request from the smartphone 11a is printed by the MFP 14A upon a request from the smartphone 11b. Explanation of the third embodiment for the same portion as that in the first embodiment is omitted.

Figure 19:
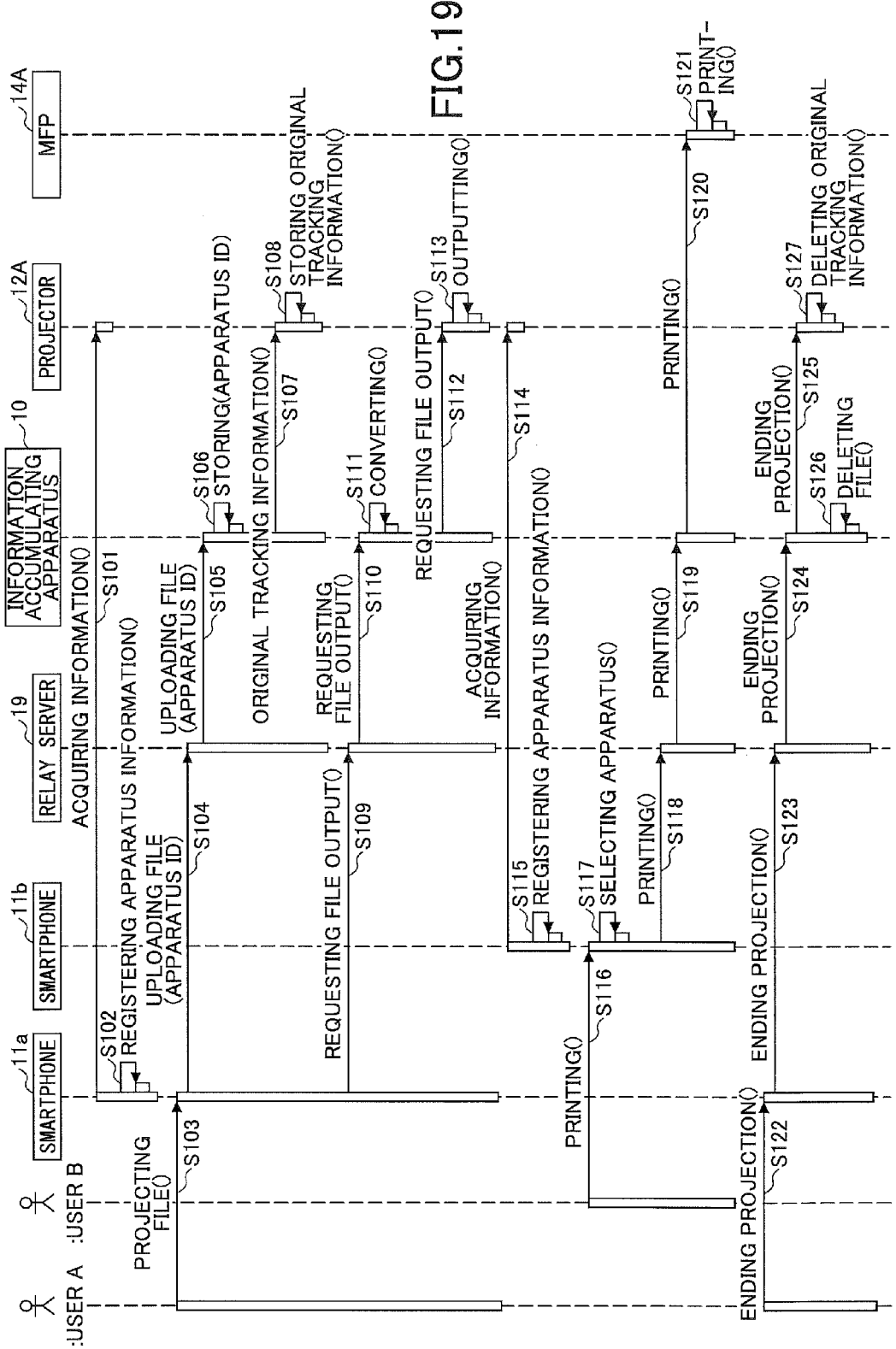
FIG. 19 is a sequence chart of an exemplary process of projecting the file and printing the file in the collaboration processing system of the embodiment.

FIG. 19 is a sequence chart of an exemplary process of projecting the file and printing the file in the collaborate processing system of the third embodiment. Referring to FIG. 10, the smartphone 11a is operated by the user A and the smartphone 11b is operated by the user B.

In step S101, the apparatus information acquiring unit 27 of the smartphone 11a acquires the apparatus information of the projector 12A illustrated in FIG. 9 from the short-range wireless apparatus 16A. In step S102, the memory unit 28 of the smartphone 11a stores (registers) the apparatus information of the projector 12A acquired by the apparatus information acquiring unit 27.

Figure 20:
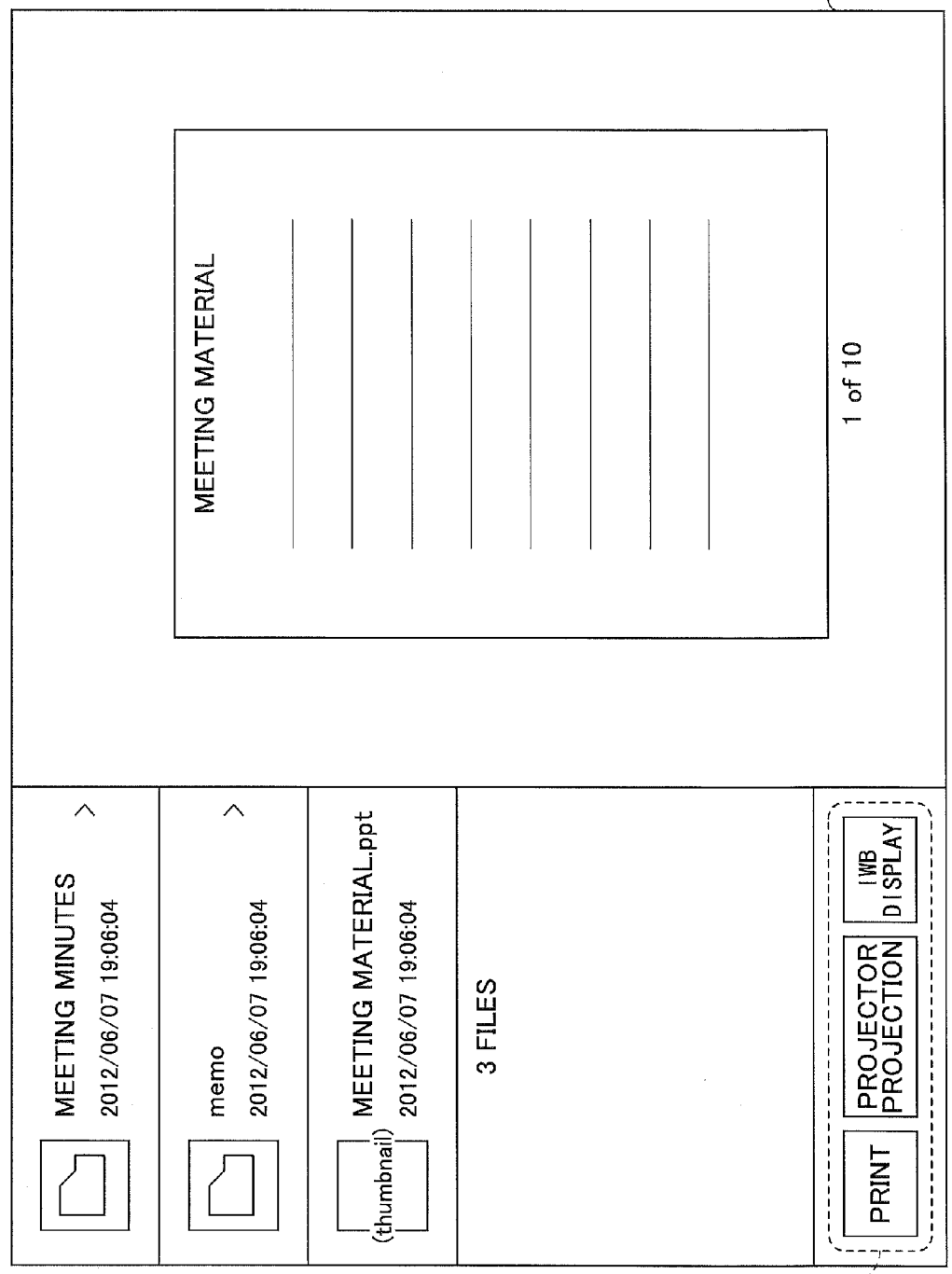
FIG. 20 illustrates an image of an exemplary UI receiving a selection of the file output from the user.

In step S103, the display unit 21 of the smartphone 11a displays the UI 1100 as illustrated in FIG. 20 on the display 616 and receives an input operation from the touch panel 617 by the user A. FIG. 20 illustrates an image of an exemplary UI receiving a selection of the file output from the user. The UI 1100 illustrated in FIG. 20 includes a print button for selecting a print operation as the file output, a projector projection button 1101 for selecting a projector projection, and an IWB display button for selecting an IWB display. By pushing the projector projection button 1101, the user A performs an input operation for projecting the file using the input unit 22.

Because the processes of steps S104 to S113 are similar to the processes of steps S4 to S13 of FIG. 10, explanation is omitted.

In step S114, the apparatus information acquiring unit 27 of the smartphone 11b acquires the apparatus information of the projector 12A illustrated in FIG. 11 from the short-range wireless apparatus 16A. In step S115, the memory unit 28 of the smartphone 11b stores (registers) the apparatus information of the projector 12A acquired by the apparatus information acquiring unit 27. Thus, the smartphone 11b can acquire the original tracking information of the file currently being projected by the projector 12A from the short-range wireless apparatus 16A.

Figure 21:
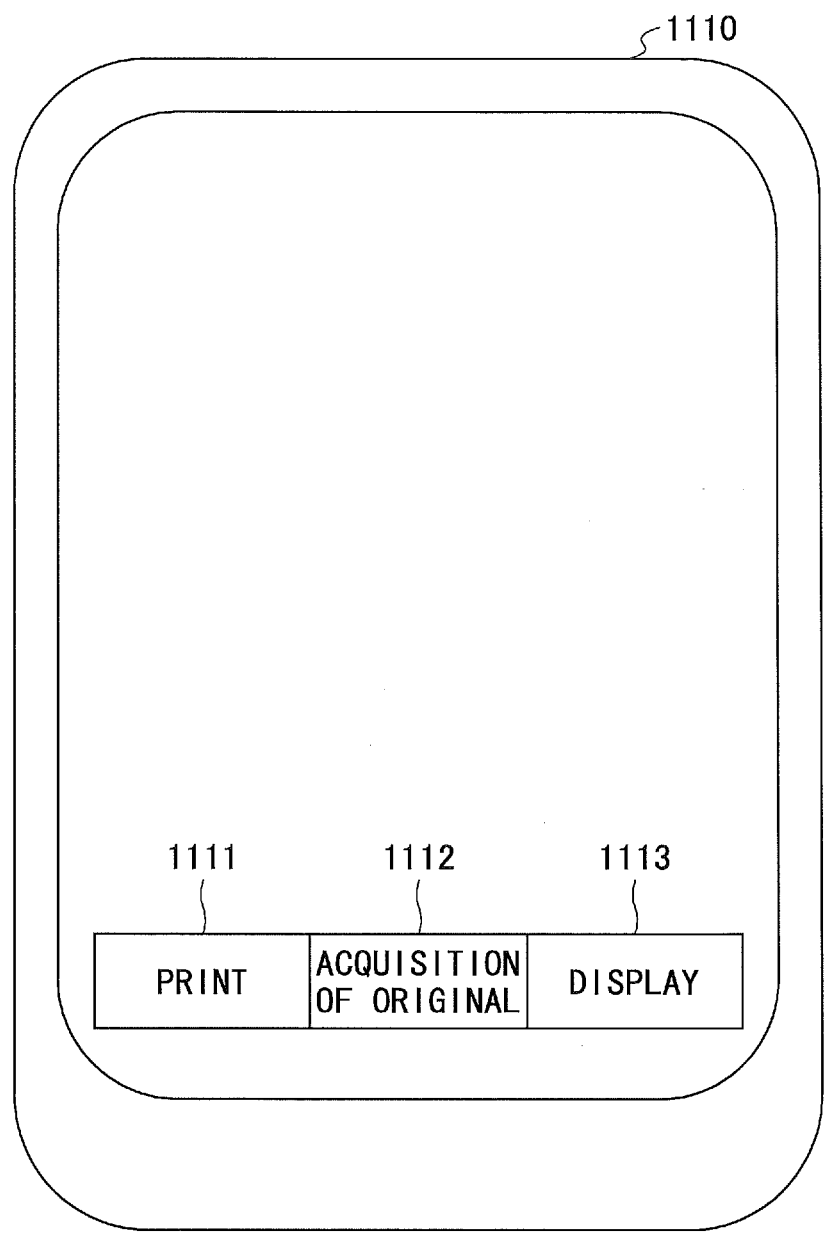
FIG. 21 illustrates an image of an exemplary UI receiving a print request, the acquisition of the original, and a display from the user.

In step S116, the display unit 21 of the smartphone 11b displays the UI 1110 as illustrated in FIG. 21 on the display 616 and receives an input operation for printing the file, acquiring the original of the file, and displaying the file operated by the user B from the touch panel 617. FIG. 21 illustrates an image of an exemplary UI receiving the print, the acquisition of the original, and the display from the user.

A print button 1111 for selecting the print operation, a button for selecting the acquisition of the original, and a display button 1113 are provided on the UI 1110 illustrated in FIG. 21. When the user B pushes the print button 1111, the user B can perform an input operation for causing the file currently being projected by the projector 12A to be printed by the MFP 14A. When the user B pushes the button 1112 for the acquisition of the original, the user can perform an input operation for acquiring the original of the file currently being projected by the projector 12A. When the user B pushes the display button 1113, the user B can perform an input operation for causing the file currently being projected by the projector 12A to be displayed by the IWB 13A. Here, described is a case where the user B pushes the print button 1111.

In step S117, the smartphone 11b may receive an input operation for selecting the MFP 14A from the user B in a case where the apparatus information of the multiple MFPs 14 is stored in the memory unit 28.

The original acquisition requesting unit 29 of the smartphone 11b reads the original tracking information out of the apparatus information of the projector 12A illustrated in FIG. 11 and stored in the memory unit 28. In steps S118 and S119, the original acquisition requesting unit 29 uses the original tracking information and requests to print the file currently being output by the projector 12A along with the apparatus ID of the projector 12A read out of the apparatus information of the projector 12A.

The data sending unit 43 of the information accumulating apparatus 10 receiving the print request from the smartphone 11b sends the file currently being output by the projector 12a to the MFP 14A. The data form of the file sent to the MFP 14A is converted to a data form enabled to be printed by the MFP 14A using the file administration unit 45 when necessary.

In step S121, the MFP 14A prints the file currently being output by the projector 12a. The smartphone 11b, which cannot be connected to the network N3 connected to the projector 12A, can easily print the file currently being projected by the projector 12A. Because the processes of steps S122 to S127 are similar to the processes of steps S19 to S24 of FIG. 10, explanation is omitted.

Within the third embodiment, described is the example where the file currently being projected by the projector 12A upon the request from the smartphone 11a is printed by the MFP 14A upon the request from the smartphone 11b. Using a procedure similar thereto, the file currently being output by the projector 12a upon a request from the smartphone 11a can be printed by the MFP 14A upon a request from the smartphone 11a.

Fourth Embodiment

Figure 22:
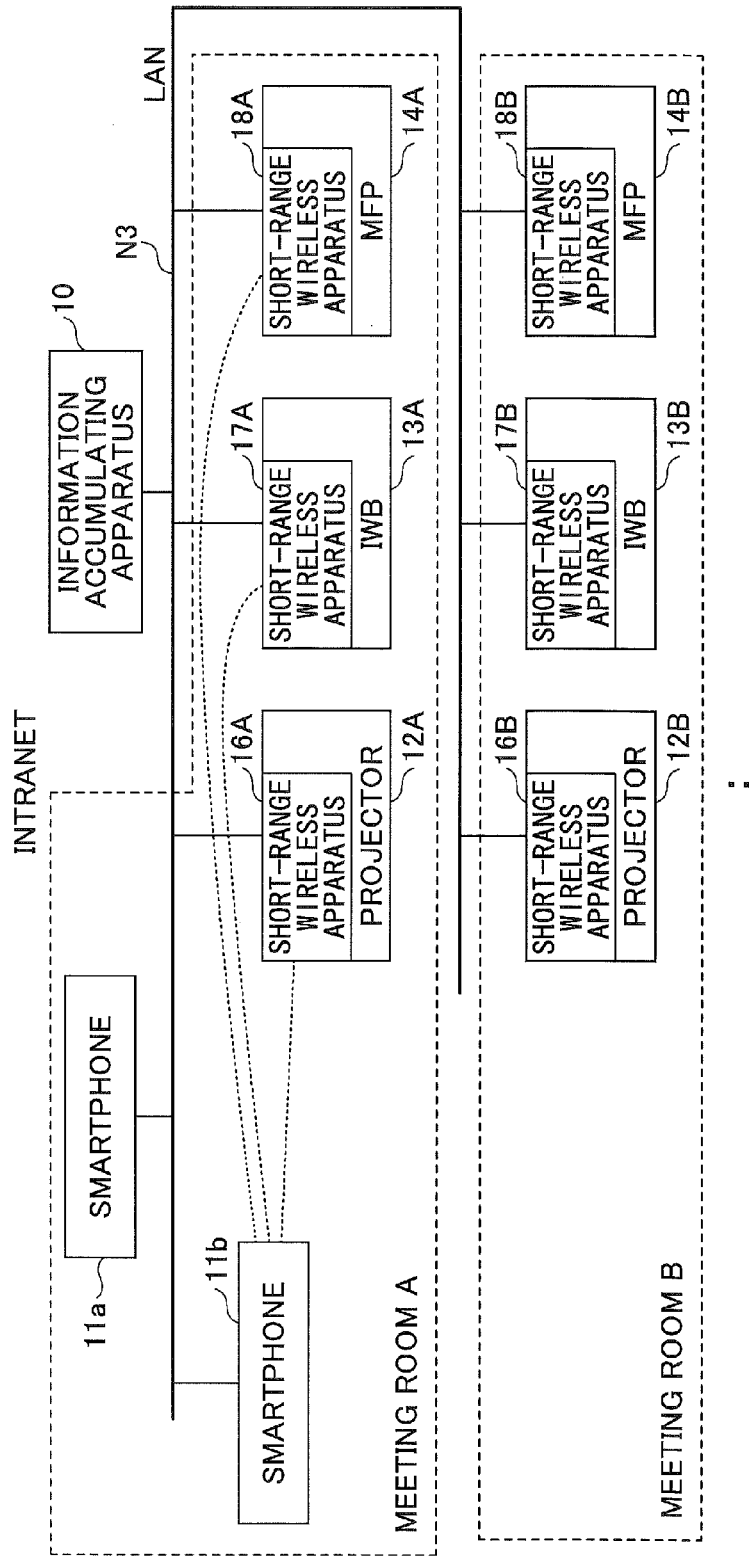
FIG. 22 illustrates another exemplary structure of the collaboration processing system of the embodiment.

The next described embodiment is a case where the smartphone 11 is connected to an intranet. Within a fourth embodiment, as illustrated in FIG. 22, the smartphone 11a and the smartphone 11b are connected to the intranet.

Figure 23:
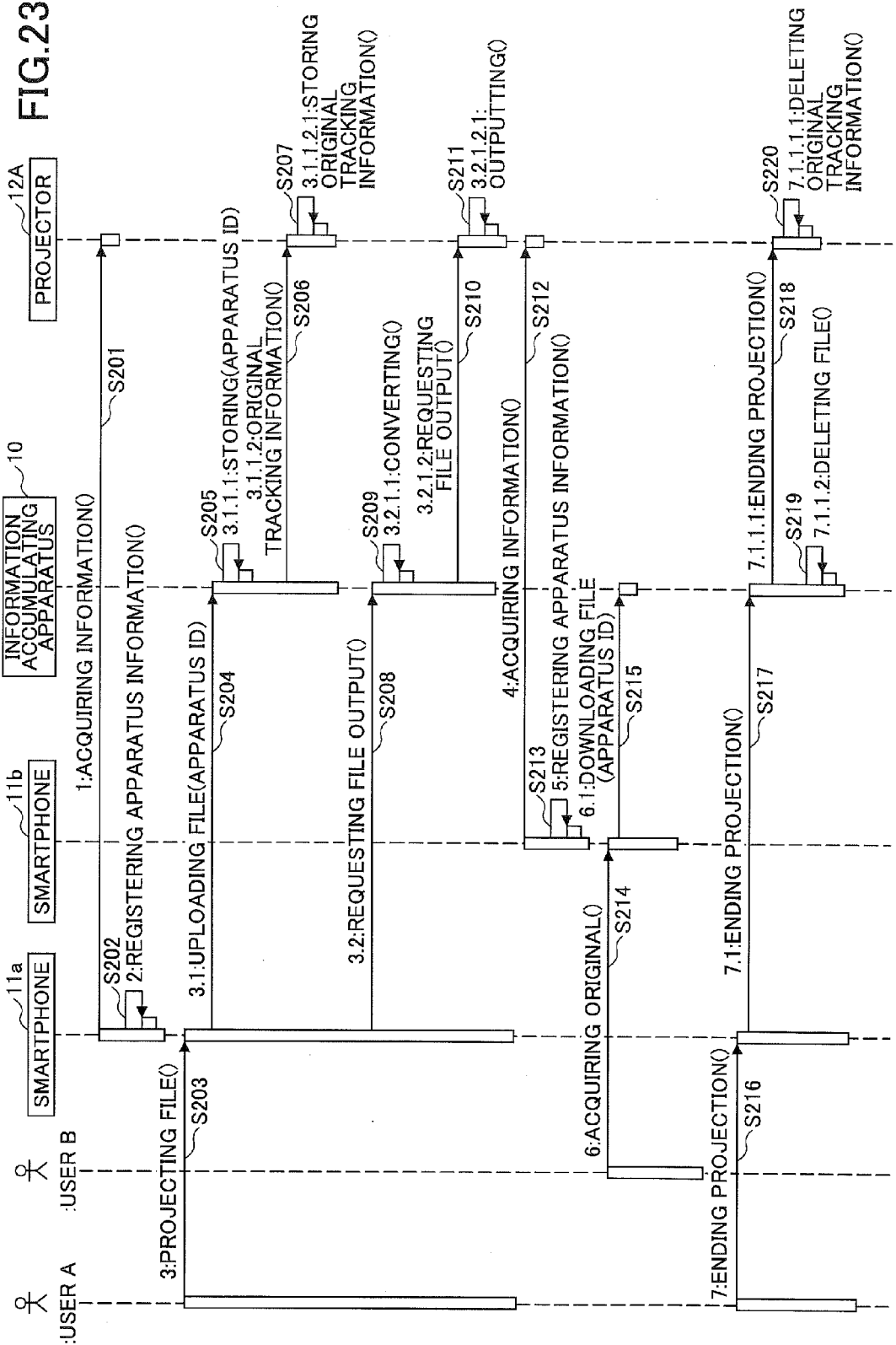
FIG. 23 is a sequence chart of another exemplary process of projecting the file and acquiring the original in the collaboration processing system of the embodiment.

An exemplary process of the fourth embodiment is illustrated in FIG. 23. Referring to FIG. 23, the smartphone 11a and the smartphone 11b directly communicate with the information accumulating apparatus 10 through the intranet. With the fourth embodiment, the above collaboration processing system 1 can be substantialized in a case where it is unnecessary to use the relay server 19.

Fifth Embodiment

The next described embodiment is a case where the information accumulating apparatus 10 holds the original tracking information. An exemplary process of a fifth embodiment is illustrated in FIG. 24.

In step S301, the apparatus information acquiring unit 27 of the smartphone 11a acquires the apparatus information of the projector 12A illustrated in FIG. 9 from the short-range wireless apparatus 16A. In step S302, the memory unit 28 of the smartphone 11a stores (registers) the apparatus information of the projector 12A acquired by the apparatus information acquiring unit 27. The apparatus information may not be always acquired from the short-range wireless apparatus 16A and may be acquired by capturing an image in which the apparatus information such as a QR code (the "QR code" is a registered trademark) is embedded.

In step S303, the input unit 22 of the smartphone 11a receives an input operation for projecting the file from the user A. In step S304, the data sending unit 25 of the smartphone 11a uploads the file to be projected along with the apparatus ID of the projector 12A read out of the apparatus information of the projector 12A to the information accumulating apparatus 10.

In step S305, the file administration unit 45 of the information accumulating apparatus 10 stores the file to be projected in association with the apparatus ID of the projector 12A.

In step S306, the file administration unit 45 of the information accumulating apparatus 10 registers the original tracking information including the file path of the file to be projected into the apparatus information (see FIG. 9) of the projector 12A as illustrated in FIG. 11. Because the file to be projected is stored in association with the apparatus ID in step S305, it is unnecessary to store the original tracking information (see step S306). This is because the information accumulating apparatus 10 can identify the file output by a target apparatus (the projector 12A) by storing the file to be projected in association with the file to be projected.

In step S307, the file administration unit 45 of the information accumulating apparatus 10 converts a data form of the file to be projected to a data form capable of being projected by the projector 12A. The conversion of the data form of the file to be projected in step S11 is performed when necessary. In step S308, the request processing unit 48 of the information accumulating apparatus 10 requests to register the original tracking information including the stored file path to be projected. The projector 12A projects the file sent from the information accumulating apparatus 10 in response to the received request.

In step S310, the apparatus information acquiring unit 27 of the smartphone 11b acquires the apparatus information of the projector 12A illustrated in FIG. 9 from the short-range wireless apparatus 16A. In step S311, the memory unit 28 of the smartphone 11b stores (registers) the apparatus information of the projector 12A acquired by the apparatus information acquiring unit 27.

In step S312, the display unit 21 of the smartphone 11b displays the UI as illustrated in FIG. 13 on the display 616 and receives an input operation for acquiring the original from the touch panel 617 operated by the user B.

In step S313, the original acquisition requesting unit 30 uses the apparatus information acquired in step S310 and requests to download the file currently being output by the projector 12A along with the apparatus ID of the projector 12A read out of the apparatus information of the projector 12A.

The data sending unit 43 of the information accumulating apparatus 10 receiving the file download request from the smartphone 11b uses the original tracking information stored in step S306 and identifies the original of the file currently being output by the projector 12a (step S314). Then, the data sending unit 43 of the information accumulating apparatus 10 converts the identified file so as to be a form enabled to be displayed by the smartphone 11b (step S315), and sends the the converted file to the smartphone 11b (step S316). In a case where the information accumulating apparatus 10 does not store the original tracking information in step S306, the information accumulating apparatus 10 may identify the file by using the apparatus ID stored along with the file in step S305.

In step S318, the input unit 22 of the smartphone 11a receives an input operation for ending the projection from the user A. In step S319, the output request unit 29 of the smartphone 11a uses the apparatus information of the projector 12A illustrated in FIG. 9 to send a projection end request for the projector 12A to the information accumulating apparatus 10.

In step S320, the file administration unit 45 of the information accumulating apparatus 10 deletes the file to be projected stored in association with the apparatus ID of the projector 12A in step S305. Further, in step S321, the file administration unit 45 of the information accumulating apparatus 10 deletes the original tracking information stored in step S306. In step S322, the request sending unit 50 of the information accumulating apparatus 10 sends the projection end request to the projector 12A.

With this process, it is possible to acquire the file currently being output even though the projector has not a function of causing the original information to be stored in the projector.

<General Overview>

As described, according to the collaboration processing system 1 of the embodiments, the original of the data currently being output by the electronic apparatus such as the projector 12 can be easily acquired by the smartphone 11 which cannot be connected to the network N3 connected to the electronic apparatus.

Further, according to the collaboration processing system 1 of the embodiments, because the smartphone 11 can acquire the apparatus information from the short-range wireless apparatuses 16 to 18 of the electronic apparatus, it is possible to omit a labor for a user of inputting the apparatus information into the smartphone 11. Furthermore, according to the collaboration processing system 1 of the embodiments, the security can be improved. This is because if the smartphone 11 cannot acquire the apparatus information from the short-range wireless apparatuses 16 to 18 of the electronic apparatus, it is not possible to acquire the original of the data currently being displayed by the electronic apparatus, print the data, and display the data.

Furthermore, according to the collaboration processing system 1 of the embodiments, when a user carrying the smartphone approaches the vicinity of the electronic apparatus, the smartphone 11 acquires the apparatus information of the electronic apparatus by the short-range wireless communication.

Furthermore, according to the collaboration processing system 1 of the embodiments, the information accumulating system 10 stores the original of the data currently being output by the electronic apparatus before the electronic apparatus outputs the data. After the data are output to the electronic apparatus, the smartphone 11 acquiring the apparatus information from the electronic apparatus can acquire the original of the data currently being output by the electronic apparatus from the information accumulating apparatus 10 by using the apparatus information of the electronic apparatus.

The network N1 is an example of a first network recited in the claims. The network N3 is an example of a second network recited in the claims. The smartphone 11a is an example of a first terminal apparatus recited in the claims. The smartphone 11b is an example of a second terminal apparatus recited in the claims. The information accumulating apparatus 10 is an example of an information processing apparatus recited in the claims. The projector 12A is an example of an electronic apparatus recited in the claims. The collaboration processing system 1 is an example of an information processing system recited in the claims. The short-range wireless apparatus 16A is an example of an apparatus information memory device recited in the claims. The guest ID is an example of identification information necessary for acquiring electronic data output by the electronic apparatus recited in the claims. The download request of the file currently being output by the projector 12A is an example of an acquisition request for electronic data recited in the claims.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although an information processing system has been described in detail, it should be understood that various changes, substitutions, and alterations could be made thereto without departing from the spirit and scope of the invention.

This application is based upon and claims the benefit of priority of the prior Japanese Patent Application No. 2014-187361, filed on Sep. 16, 2014, and the Japanese Patent Application No. 2015-167412, filed on Aug. 27, 2015, the entire contents of which are incorporated herein by reference.

What is claimed is:

1. An information processing system comprising:
a first terminal apparatus,
a second terminal apparatus; and
at least one information processing apparatus,
wherein a first terminal apparatus-includes
 a first processor that is configured to:
  acquire apparatus information of an electronic apparatus from the electronic apparatus, and
  send an image output request to output electronic image data at the electronic apparatus to the at least one information processing apparatus,
wherein the at least one information processing apparatus includes
 a memory that is configured to store a storing destination of the electronic image data to be output and identification information of the electronic apparatus in association with each other in response to the image output request,
 a second processor that is configured to:
  receive the image output request;
  request the electronic apparatus to visually output the electronic image data upon receipt of the image output request, and send to the second terminal apparatus, the electronic image data output by the electronic apparatus based on the storing destination of the electronic data stored in the memory in association with the identification information of the electronic apparatus in a case where an acquisition request to acquire the electronic data that is visually output by the electronic apparatus is received from the second terminal apparatus, wherein the second terminal apparatus includes
a third processor that is configured to:
acquire the apparatus information of the electronic apparatus from the electronic apparatus that visually outputs the electronic data, and
send the acquisition request for the electronic image data that is visually output by the electronic apparatus to the at least one information processing apparatus and acquire the electronic image data that has been previously visually output by the electronic apparatus from the at least one information processing apparatus based on the apparatus information of the electronic apparatus, wherein the at least one information processing apparatus is configured to delete the electronic image data to be output by the electronic apparatus, and the electronic apparatus is also configured to delete the storing destination of the electronic image data to be output by the electronic apparatus and the identification information of the electronic apparatus once the first terminal apparatus sends a termination signal of outputting the electronic image data to the at least one information processing apparatus.

2. The information processing system according to claim 1, wherein the first and second terminal apparatuses are connected to a first network, wherein the at least one information processing apparatus is connected to a second network different from the first network, wherein the first processor is configured to send the output request that the electronic apparatus outputs the electronic image data to the at least one information processing apparatus through a relay apparatus by using the apparatus information of the electronic apparatus, wherein the second processor is configured to:
receive the output request sent from the relay apparatus in response to an inquiry sent from the at least one information processing apparatus to the relay apparatus, and
send to the second terminal apparatus through the relay apparatus the electronic image data output by the electronic apparatus based on the storing destination of the electronic data stored in the memory in association with the identification information of the electronic apparatus in a case where the acquisition request sent from the relay apparatus in response to the inquiry sent from the at least one information processing apparatus to the relay apparatus is received, wherein the third processor is configured to send the acquisition request to the at least one information processing apparatus through the relay apparatus and acquire the electronic image data from the at least one information processing apparatus through the relay apparatus.

3. The information processing system according to claim 1, wherein the first processor is configured to acquire the apparatus information from an apparatus information memory device of the first terminal device using short-range wireless communication, wherein the third processor is configured to acquire the apparatus information and tracking information of the electronic image data output by the electronic apparatus using the short-range wireless communication.

4. The information processing system according to claim 1, wherein the first processor is configured to acquire the identification information necessary for acquiring the electronic image data output by the electronic apparatus from the electronic apparatus using short-range wireless communication, and send the output request that the electronic apparatus outputs the electronic image data to the at least one information processing apparatus by using the apparatus information and the identification information, wherein the third processor is configured to:
acquire the apparatus information, the identification information, and the tracking information of the electronic image data that is visually output by the electronic apparatus from an apparatus information memory device of the first terminal device,
send the acquisition request for the electronic image data output by the electronic apparatus to the at least one information processing apparatus by using the apparatus information, the identification information, and the tracking information, and acquire the electronic image data output by the electronic apparatus from the at least one information processing apparatus, wherein the second processor is configured to cause the apparatus information, the identification information, and the tracking information to be stored in the apparatus information memory device and request the one electronic apparatus to output the electronic image data upon the receipt of the output request that the electronic apparatus outputs the electronic data in a case where the first processor is configured to receive the output request that the electronic apparatus outputs the electronic image data, wherein the second processor is configured to provide the electronic image data output by the electronic apparatus to the second terminal apparatus based on the apparatus information, the identification information, and the tracking information in a case where the at least one information processing apparatus receives the acquisition request for the electronic image data output by the electronic apparatus.

5. The information processing system according to claim 1, wherein the memory stores the electronic image data in an original data form which is before being changed to a data form capable of being output by the electronic apparatus.

6. The information processing system according to claim 1, wherein the second processor is configured to receive the output request that the electronic apparatus outputs the electronic image data and receive a setup of whether the electronic image data is permitted to be provided to the second terminal apparatus.

7. The information processing system according to claim 1, wherein an apparatus information memory device of the first terminal device is provided to or built in the electronic apparatus.

8. The information processing system according to claim 1, wherein the electronic apparatus includes a projector that projects the electronic image data.

9. The information processing system according to claim 1, wherein the electronic apparatus is configured to delete the storing destination of the electronic image data to be output by the electronic apparatus and the identification information of the one electronic apparatus once the first terminal apparatus is disconnected to the electronic apparatus.

10. An information processing system comprising:
a first terminal apparatus;
a second terminal apparatus;
an electronic apparatuses; and
at least one information processing apparatus,
wherein the first terminal apparatus includes
a first processor that is configured to:
acquire apparatus information of an electronic apparatus from the electronic apparatus, and
send an image output request to output electronic image data at the electronic apparatus to the at least one information processing apparatus,
wherein the at least one information processing apparatus includes
a memory that is configured to store a storing destination of the electronic image data to be output and identification information of the electronic apparatus in association with each other in response to the image output request,
a second processor that is configured to:
receive the image output request;
request the electronic apparatus to visually output the electronic image data upon receipt of the image output request, and
send to the second terminal apparatus, the electronic image data output by the electronic apparatus based on the storing destination of the electronic data stored in the memory in association with the identification information of the electronic apparatus in a case where an acquisition request to acquire the electronic data that is visually output by the electronic apparatus is received from the second terminal apparatus,
wherein the second terminal apparatus includes
a third processor that is configured to:
acquire the apparatus information of the electronic apparatus from the electronic apparatus that visually outputs the electronic data, and
send the acquisition request for the electronic image data that is visually output by the electronic apparatus to the at least one information processing apparatus and acquire the electronic image data that has been previously visually output by the electronic apparatus from the at least one information processing apparatus based on the apparatus information of the electronic apparatus, and
wherein the electronic apparatus includes
a fourth processor that is configured to:
administer the apparatus information of electronic apparatus and provide the apparatus information of the electronic apparatus based on the request from a first terminal apparatus, and
receive the image output request for electronic image data and output the electronic data,
wherein the at least one information processing apparatus is configured to delete the electronic image data to be output by the electronic apparatus, and the electronic apparatus is also configured to delete the storing destination of the electronic image data to be output by the electronic apparatus and the identification information of the electronic apparatus once the first terminal apparatus sends a termination signal of outputting the electronic image data to the at least one information processing apparatus.

11. An information processing apparatus connected to first and second terminal apparatuses and an electronic apparatuses,
said first terminal apparatus including:
a first processor that is configured to:
acquire apparatus information of the electronic apparatus from the electronic apparatus, and
send an image output request to output electronic image data at the electronic apparatus to the information processing apparatus,
the information processing apparatus comprising:
a memory that is configured to store a storing destination of the electronic image data to be output and identification information of the electronic apparatus in association with each other in response to the image output request,
a second processor that is configured to:
receive the image output request;
request the electronic apparatus to visually output the electronic image data upon receipt of the image output request, and
send to the second terminal apparatus, the electronic image data output by the electronic apparatus based on the storing destination of the electronic data stored in the memory in association with the identification information of the electronic apparatus in a case where an acquisition request to acquire the electronic data that is visually output by the electronic apparatus is received from the second terminal apparatus,
said second terminal apparatus including:
a third processor that is configured to:
acquire the apparatus information of the electronic apparatus from the electronic apparatus that visually outputs the electronic data, and
send the acquisition request for the electronic image data that is visually output by the electronic apparatus to the at least one information processing apparatus and acquire the electronic image data that has been previously visually output by the electronic apparatus from the at least one information processing apparatus based on the apparatus information of the electronic apparatus,
wherein the at least one information processing apparatus is configured to delete the electronic image data to be output by the electronic apparatus, and the electronic apparatus is also configured to delete the storing destination of the electronic image data to be output by the electronic apparatus and the identification information of the electronic apparatus once the first terminal apparatus sends a termination signal of outputting the electronic image data to the at least one information processing apparatus.

* * * * *